(12) United States Patent
Singh

(10) Patent No.: US 9,821,611 B2
(45) Date of Patent: Nov. 21, 2017

(54) INDIRECT TIRE WEAR STATE ESTIMATION SYSTEM

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 166 days.

(21) Appl. No.: 14/919,029

(22) Filed: Oct. 21, 2015

(65) Prior Publication Data

US 2017/0113495 A1   Apr. 27, 2017

(51) Int. Cl.
| | | |
|---|---|---|
| *G01N 19/02* | (2006.01) | |
| *B60C 11/24* | (2006.01) | |
| *B60C 23/20* | (2006.01) | |
| *B60C 23/02* | (2006.01) | |
| *G01M 17/02* | (2006.01) | |
| *B60C 19/00* | (2006.01) | |

(52) U.S. Cl.
CPC ............ *B60C 11/246* (2013.01); *B60C 23/02* (2013.01); *B60C 23/20* (2013.01); *G01M 17/02* (2013.01); *B60C 2019/004* (2013.01)

(58) Field of Classification Search
CPC . B60C 23/0408; B60C 23/061; B60C 11/246; B60C 23/20; B60C 23/02; B60C 2019/0004; G01M 17/02; G01M 17/022; G01N 3/56
USPC .................................................... 73/8, 146.2
See application file for complete search history.

(56) References Cited

U.S. PATENT DOCUMENTS

| | | | |
|---|---|---|---|
| 5,249,460 | A | 10/1993 | Dory et al. |
| 5,303,756 | A | 4/1994 | Hill |
| 6,151,959 | A | 11/2000 | Cantu et al. |
| 6,941,800 | B2 | 9/2005 | Shimura |
| 7,180,409 | B2 | 2/2007 | Brey |
| 7,249,620 | B2 | 7/2007 | Croissant et al. |
| 7,284,417 | B2 | 10/2007 | Reynolds |
| 7,391,306 | B2 | 6/2008 | Dufournier |
| 7,404,319 | B2 | 7/2008 | Poulbot et al. |
| 7,604,029 | B2 | 10/2009 | Myatt |
| 7,670,123 | B2 | 3/2010 | Cuny et al. |
| 8,061,191 | B2 | 11/2011 | Hanatsuka |
| 8,493,200 | B2 | 7/2013 | Wakao et al. |
| 9,259,976 | B2 | 2/2016 | Singh et al. |
| 9,340,211 | B1 * | 5/2016 | Singh ................. B60W 40/068 |

(Continued)

FOREIGN PATENT DOCUMENTS

| | | |
|---|---|---|
| DE | 19745734 A1 | 4/1999 |
| EP | 1798071 A2 | 12/2006 |

(Continued)

OTHER PUBLICATIONS

EPO Search report received by Applicant dated Mar. 15, 2017.

*Primary Examiner* — Eric S McCall
*Assistant Examiner* — Mohammed E Keramet-Amircola
(74) *Attorney, Agent, or Firm* — Edward T. Kennedy

(57) ABSTRACT

A tire wear state estimation system includes a vehicle-based sensor for measuring wheel speed of a tire-supporting and first and second features extracted from the wheel speed signal. A data classifier conducts a classification of the first extraction feature data relative to the second extraction feature data by a statistical analysis of the wheel speed signal to estimate the wear state of the tire.

6 Claims, 31 Drawing Sheets

(56) References Cited

U.S. PATENT DOCUMENTS

| | | | |
|---|---|---|---|
| 9,610,810 B1* | 4/2017 | Singh | B60C 23/0488 |
| 9,719,886 B2 | 8/2017 | Luk et al. | |
| 2008/0084285 A1 | 4/2008 | Bhogal | |
| 2010/0238007 A1 | 9/2010 | Kikuchi et al. | |
| 2014/0114558 A1* | 4/2014 | Singh | G01G 19/086 |
| | | | 701/124 |
| 2014/0257629 A1* | 9/2014 | Singh | B60C 23/064 |
| | | | 701/34.4 |
| 2014/0260585 A1* | 9/2014 | Singh | B60C 23/0488 |
| | | | 73/146.3 |
| 2014/0277926 A1* | 9/2014 | Singh | B60C 23/04 |
| | | | 701/34.4 |
| 2014/0278040 A1* | 9/2014 | Singh | G01M 17/06 |
| | | | 701/124 |
| 2014/0366618 A1* | 12/2014 | Singh | B60C 23/04 |
| | | | 73/146.3 |
| 2015/0040656 A1* | 2/2015 | Singh | B60C 23/0408 |
| | | | 73/146.5 |
| 2015/0057877 A1* | 2/2015 | Singh | B60C 11/246 |
| | | | 701/34.4 |
| 2015/0174967 A1 | 6/2015 | Lehmann et al. | |
| 2015/0217607 A1* | 8/2015 | Singh | B60C 23/0488 |
| | | | 152/510 |
| 2015/0231932 A1* | 8/2015 | Singh | B60C 11/246 |
| | | | 701/34.4 |
| 2015/0239298 A1 | 8/2015 | Kretschmann | |
| 2015/0247780 A1 | 9/2015 | Kretschmann et al. | |
| 2015/0284021 A1* | 10/2015 | Singh | B60C 19/00 |
| | | | 701/41 |
| 2015/0360525 A1* | 12/2015 | Singh | B60C 23/20 |
| | | | 374/141 |
| 2016/0033367 A1 | 2/2016 | Unterreiner et al. | |
| 2016/0121668 A1* | 5/2016 | Singh | G01L 5/00 |
| | | | 702/42 |
| 2016/0129894 A1* | 5/2016 | Singh | B60C 19/00 |
| | | | 701/74 |
| 2016/0146706 A1* | 5/2016 | Singh | B60T 8/1725 |
| | | | 73/8 |
| 2016/0159367 A1* | 6/2016 | Singh | B60W 40/10 |
| | | | 701/32.9 |
| 2016/0161373 A1* | 6/2016 | Singh | B60C 23/04 |
| | | | 73/8 |

FOREIGN PATENT DOCUMENTS

| | | |
|---|---|---|
| FR | 3006242 A1 | 12/2014 |
| JP | 1-307526 | 12/1989 |
| JP | 2005-028950 | 2/2005 |
| WO | 2014053322 A1 | 4/2014 |
| WO | WO2014195605 A1 | 12/2014 |

* cited by examiner

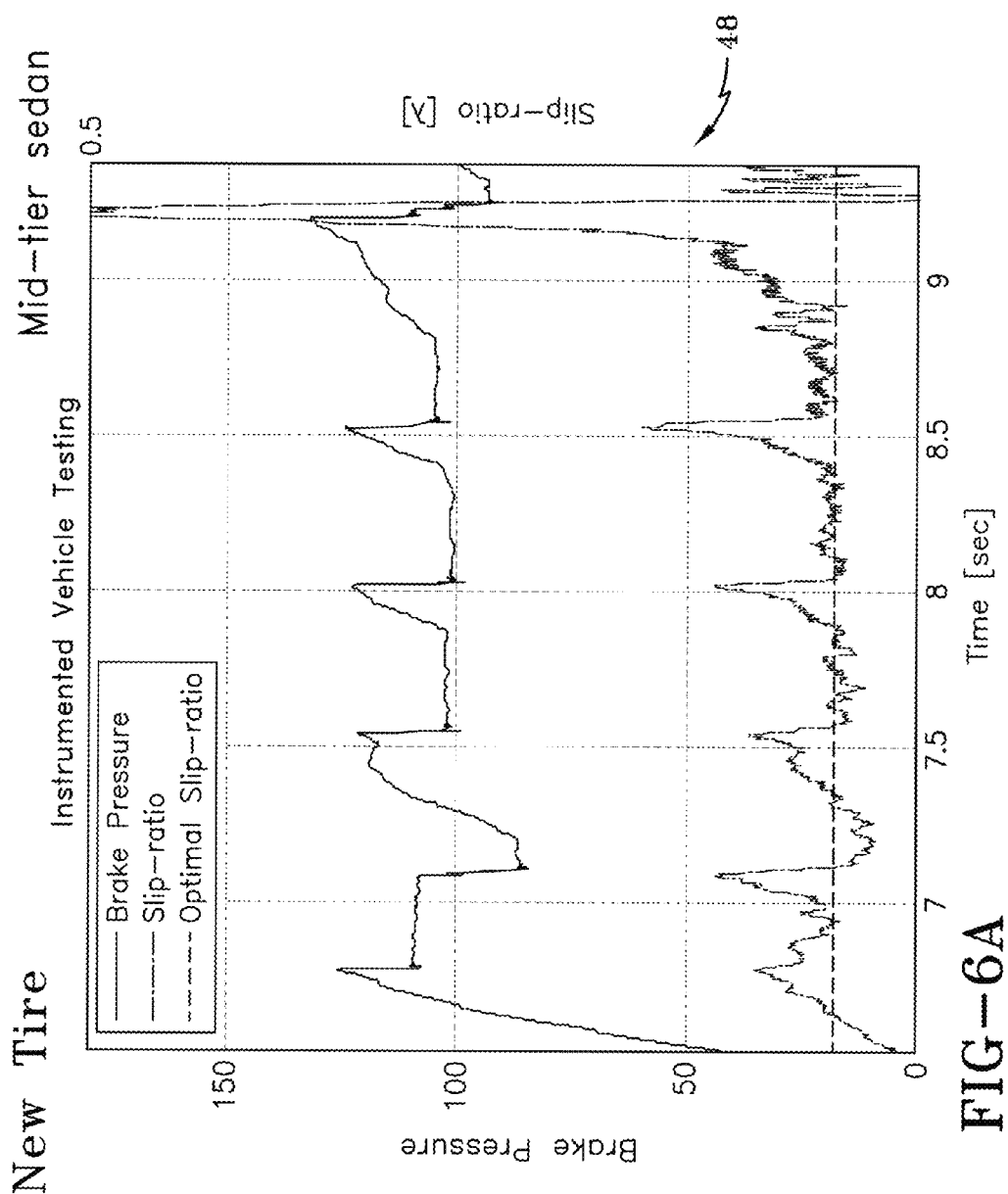

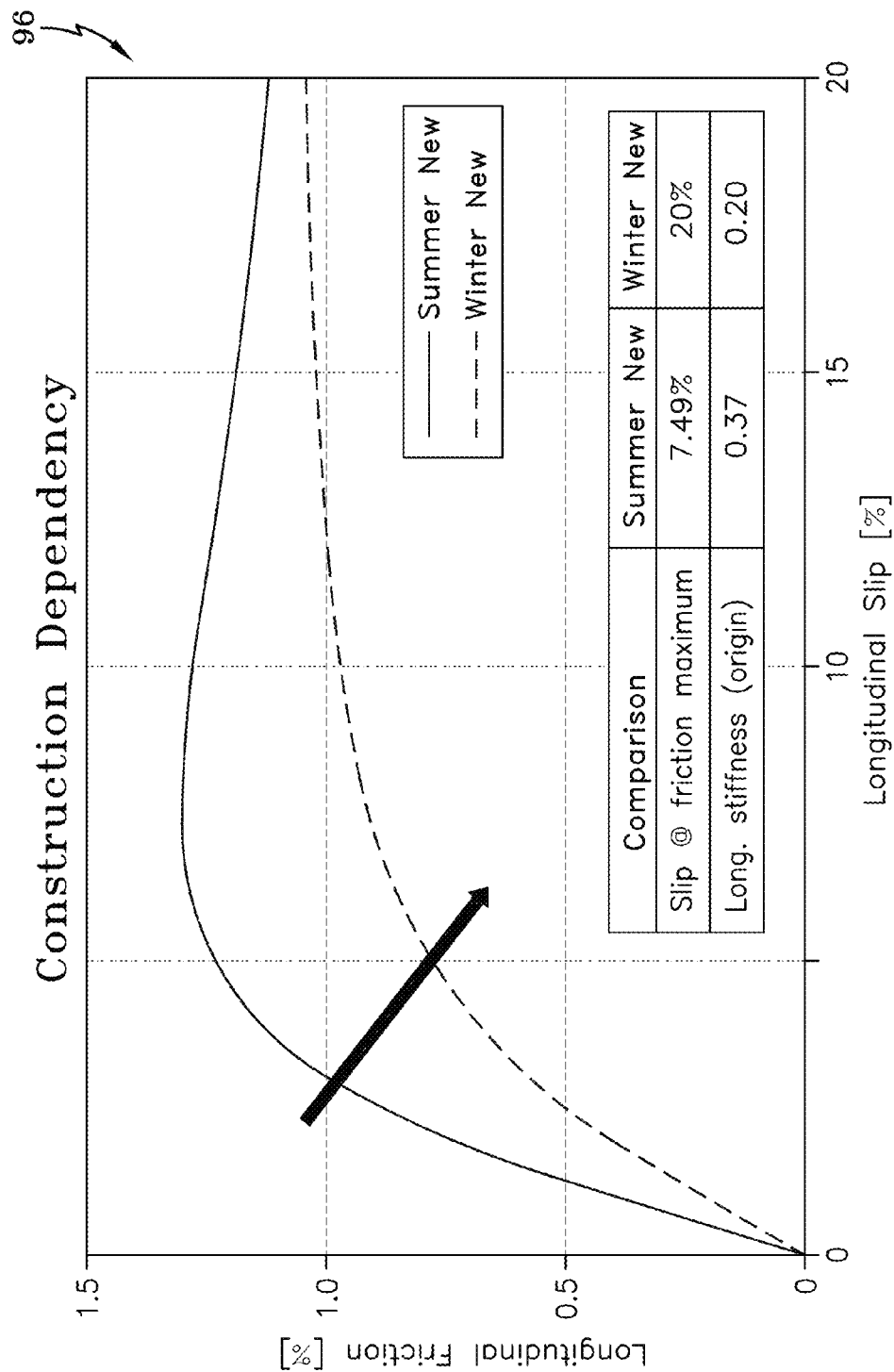

INDIRECT TIRE WEAR STATE ESTIMATION SYSTEM

FIELD OF THE INVENTION

The invention relates generally to tire monitoring systems for determining tire tread wear and, more particularly, to a system and method for estimating tire wear state based upon sensor measurements.

BACKGROUND OF THE INVENTION

Tire wear plays an important role in vehicle safety, reliability and performance. Tread wear, referring to the loss of tread material, directly affects such vehicle factors. Tread wear may be monitored and measured through placement of wear sensors in the tire tread. Reliability of the direct wear measurement of tire tread, however, can be problematic due to issues such as sensor failure, difficulty in sensor integration into a tire tread and difficulty in retrieval of sensor data over the lifetime of a tire tread.

It is accordingly desirable to achieve a system and method that accurately and reliably measures tire wear state and communicates wear state to vehicle operators and/or to vehicle operating systems such as braking and stability control systems.

SUMMARY OF THE INVENTION

According to one aspect of the invention, a tire wear state estimation system for a tire supporting a vehicle includes a vehicle-based sensor for measuring wheel speed of the wheel supporting the tire and generating a wheel speed signal; a feature-extracting processor for extracting from the wheel speed signal a first extracted feature, the first extracted feature quantitatively changing responsive to a wear level change of the tire; a feature-extracting processor for extracting from the wheel speed signal a second extracted feature, the second extracted feature quantitatively changing responsive to a wear level change of the tire; a data classifier receiving as inputs first extracted feature data and second extracted feature data; the data classifier operable to conduct a classification of the first extraction feature data relative to the second extraction feature data; and a wear state estimator operable to estimate a wear state for the tire based upon the classification of the first extraction feature data relative to the second extraction feature data.

In another aspect, the first extracted feature is a median slip-ratio of the tire and the second extracted feature is a slip-ratio rate of the tire.

Pursuant to another aspect, the median slip-ratio of the tire and the slip-ratio rate of the tire are determined by a statistical analysis of the wheel speed signal.

The estimation of the wear state of the tire is determined in a further aspect from a support vector data classification algorithm using as inputs the median slip-ratio data of the tire and the slip-ratio data of the tire.

In another aspect, the tire wear state estimator is operative to estimate the tire wear state from a combined updated averaging of the estimated slow-speed effective radius estimations of the tire during the slow-speed distance intervals.

According to another aspect, a display is provided for communicating the estimated tire wear state to an operator of the vehicle. The display may be vehicle-based and/or a handheld device connected to receive wireless communication of the estimated tire wear state from the tire-wear state estimator.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"PSD" is power spectral density (a technical name synonymous with FFT (fast fourier transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 6A is a graph showing instrumented vehicle testing results of a new tire on a mid-tier sedan, graphing brake pressure, slip-ratio and optimal slip-ratio over time.

FIG. 14C is a graph showing tire construction dependency between longitudinal friction and longitudinal slip.

DETAILED DESCRIPTION OF THE INVENTION

Figure 1:
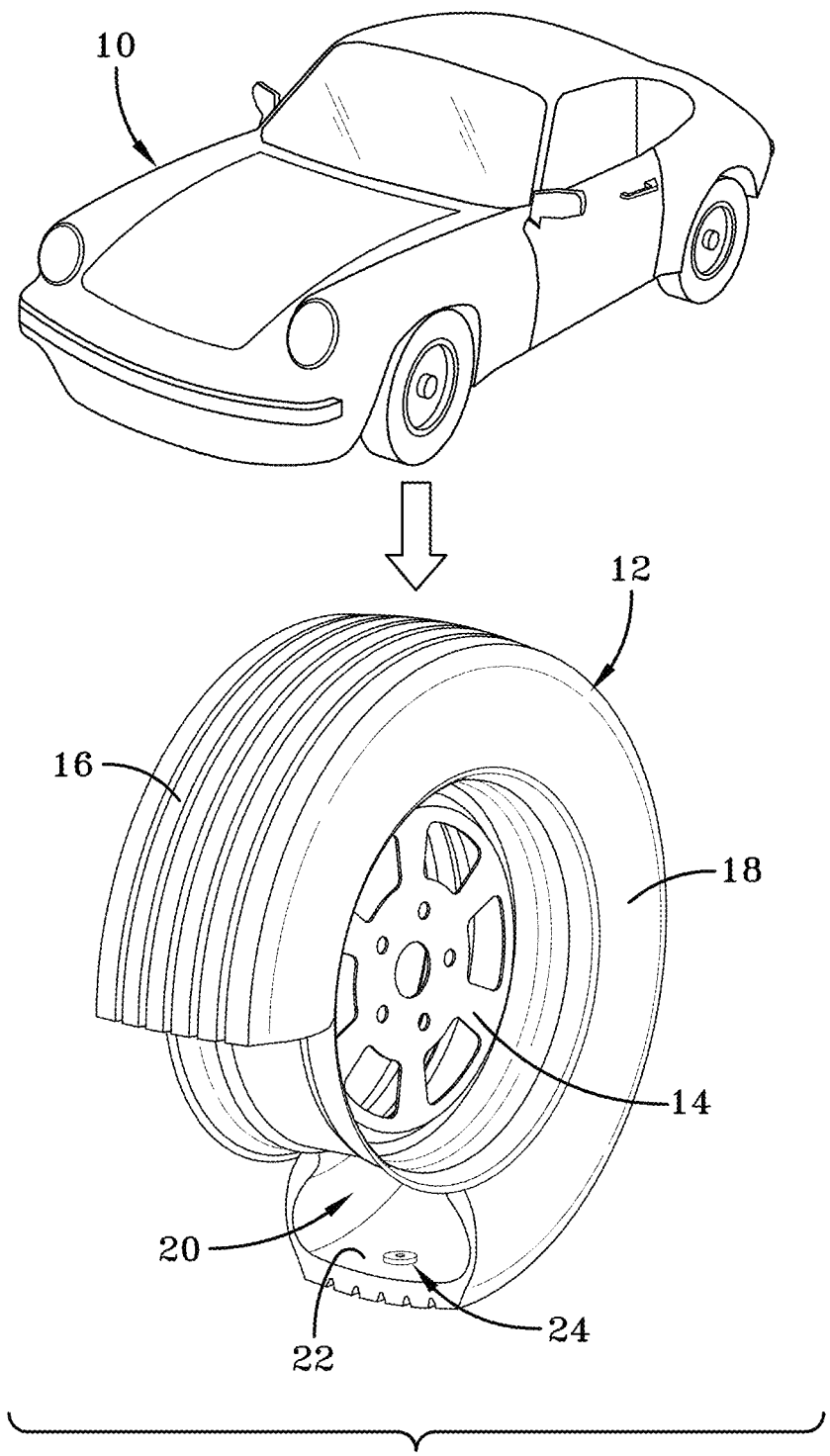
FIG. 1 is perspective view of a vehicle and a sensor-equipped tire.
Figure 15:
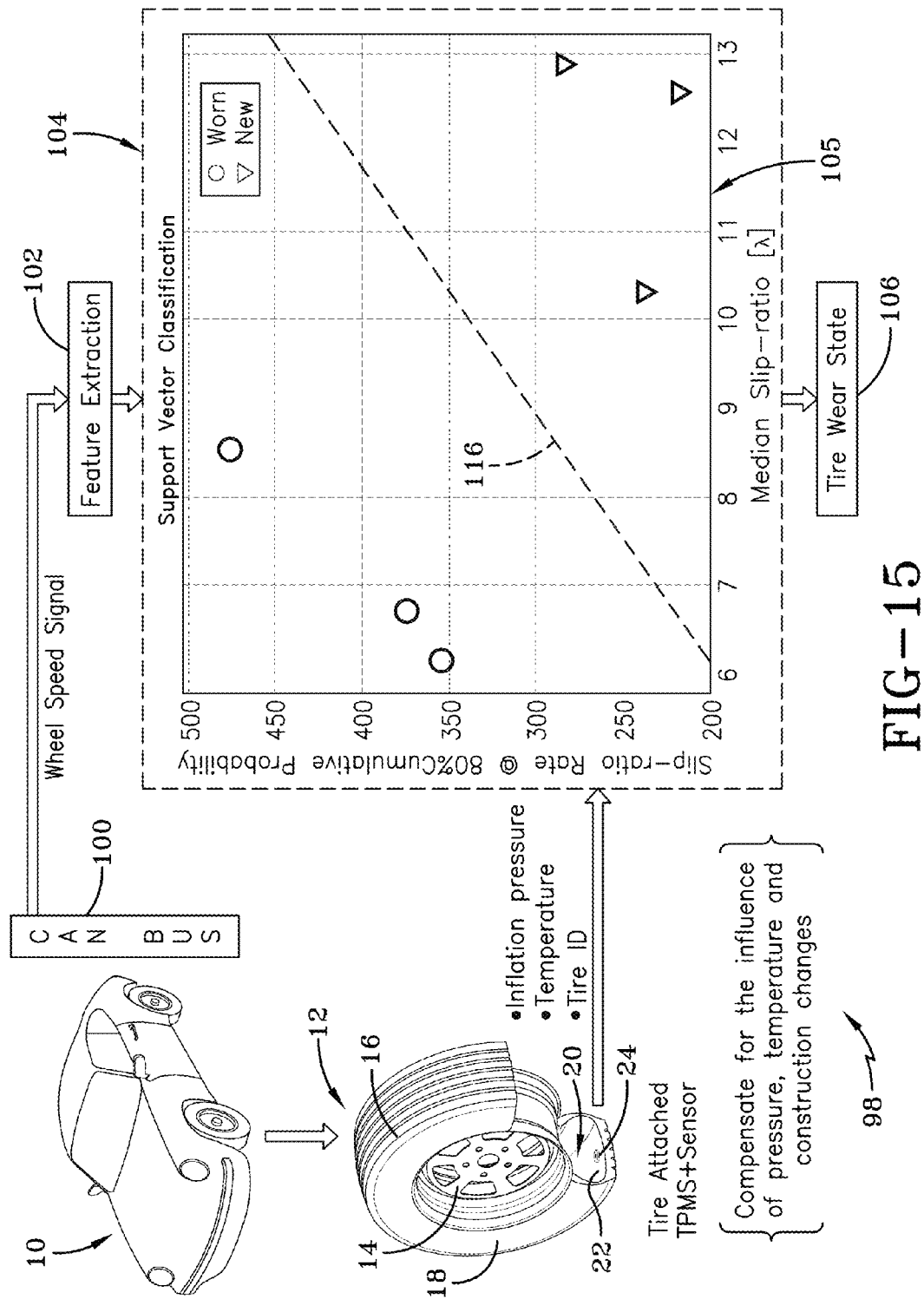
FIG. 15 is a system diagram showing tire wear state estimation.

Referring to FIGS. 1 and 15, a tire wear estimation system is shown for estimating tread wear on each tire 12 supporting vehicle 10. While vehicle 10 is depicted as a passenger car, the invention is not to be so restricted. The principles of the invention find application in other vehicle categories such as commercial trucks in which vehicles may be supported by more or fewer tires. The tires 12 are of conventional construction mounted to a wheel 14 and each having a circumferential tread 16 that wears from road abrasion with age and tire sidewalls 18. Each tire is equipped with a sensor or transducer 24 mounted to the tire for the purpose of detecting tire pressure, temperature, and a tire identification (tire ID) and transmitting such sensor measurements and tire ID data to a remote processor for analysis. The sensor 24, referred alternatively herein as a tire pressure monitoring (TPMS) module or sensor, is of a type commercially available and may be affixed to the tire inner liner 22 by suitable means such as adhesive. The sensor 24 may be of any known configuration, such as piezoelectric sensors that detect a pressure within a tire cavity 20. The tire ID data provided by the module 24 is used to reference a tire construction database from which construction characteristics of the tire 12 are extracted for a purpose explained below.

The subject system and method for estimating a tire wear state attempts to overcome the challenges in measuring a tire wear state directly by means of tire mounted wear sensors. As such, the subject system and method is referred herein as an "indirect" wear sensing system and method. The direct approach to measuring tire wear from tire mounted sensors has multiple challenges. Placing the sensors in the "green" tire to be cured at high temperatures may cause damage to the wear sensors. In addition, sensor durability can prove to be an issue in meeting the millions of cycles requirement for tires. Moreover, wear sensors in a direct measurement approach must be small enough not to cause any uniformity problems as the tire rotates at high speeds. Finally, wear sensors can be costly and add significantly to the cost of the tire.

Figure 2A:
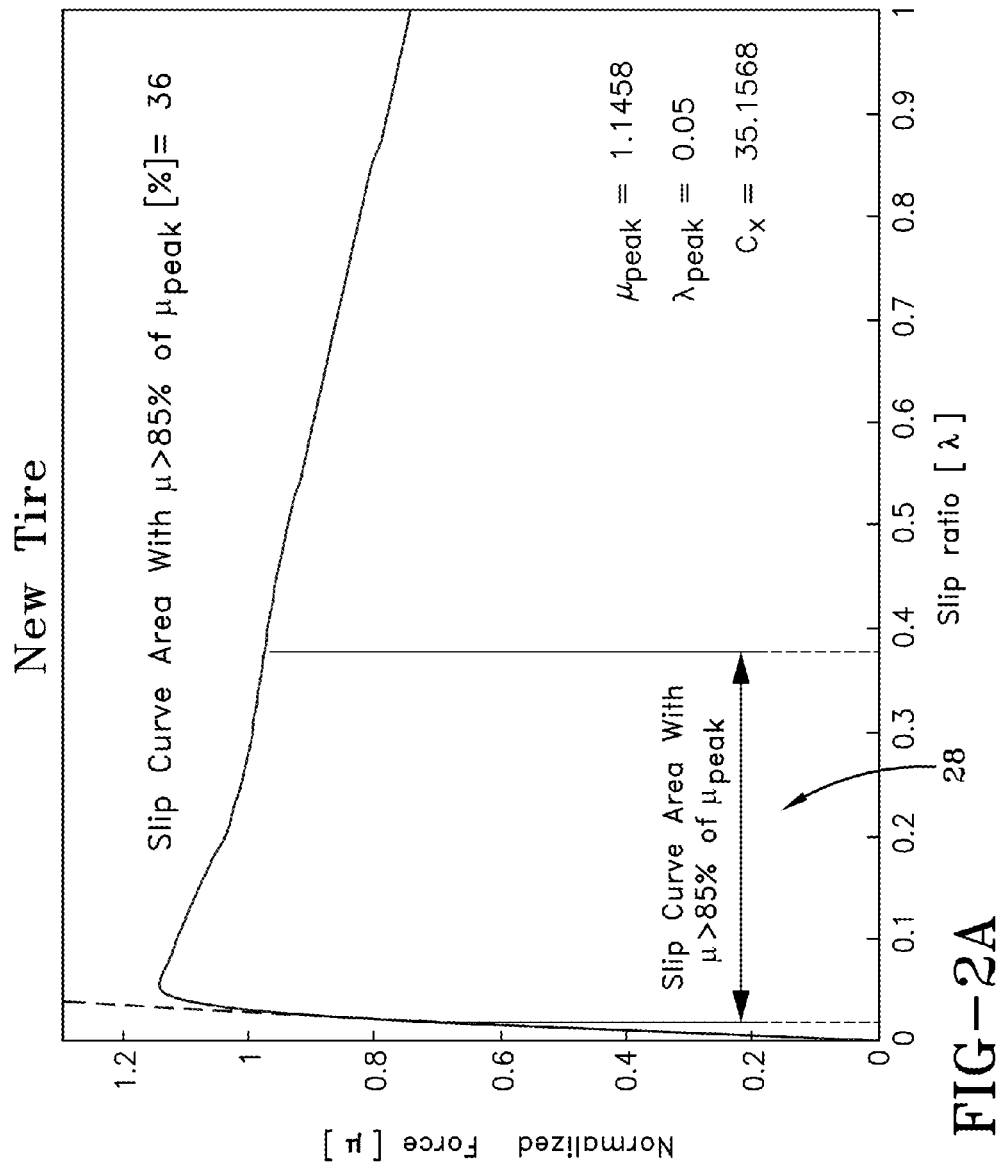
FIG. 2A is a graph for a new tire showing normalized force vs. slip-ratio.
Figure 2B:
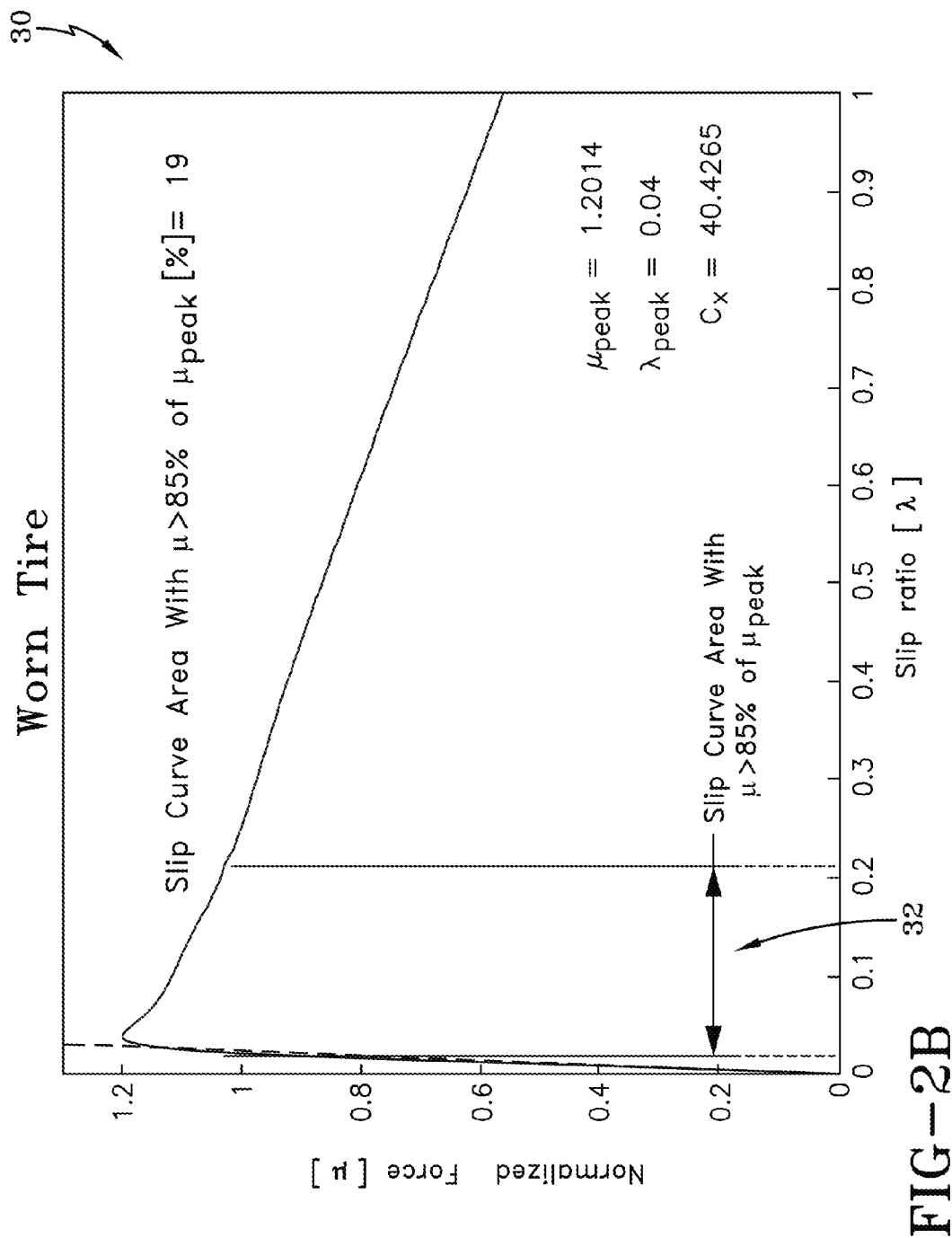
FIG. 2B is a graph for a worn tire showing normalized force vs. slip-ratio.

The subject tire wear estimation system utilizes an indirect approach, and avoids the problems attendant use of tire wear sensors mounted directly to a tire tread. The system utilizes instead a tire wear state estimation algorithm using signals available on the vehicle CAN bus (controller area network) in combination with tire ID, tire pressure, and tire temperature information (tire TPMS). The system utilizes the influence of the tire wear state on the mu-slip ratio curve, comparing new tire mu vs. slip-ratio with that of a worn tire. FIG. 2A shows a slip-curve area in curve 26 generated from a braking skid trailer test. The skid was equipped with a Goodyear Eagle F1 asymmetric tire size 255/45ZR19. Curve 26 shows the slip-curve from a new tire and identifies normalized force [$\mu$] vs. slip-ratio [$\lambda$]. The slip-curve area for a new tire with $\mu$>85% of $\mu_{peak}$ [%]=36 is indicated at numeral 28. In FIG. 2B the curve 30 is shown but for a worn tire with area 32 identified.

Figure 2C:
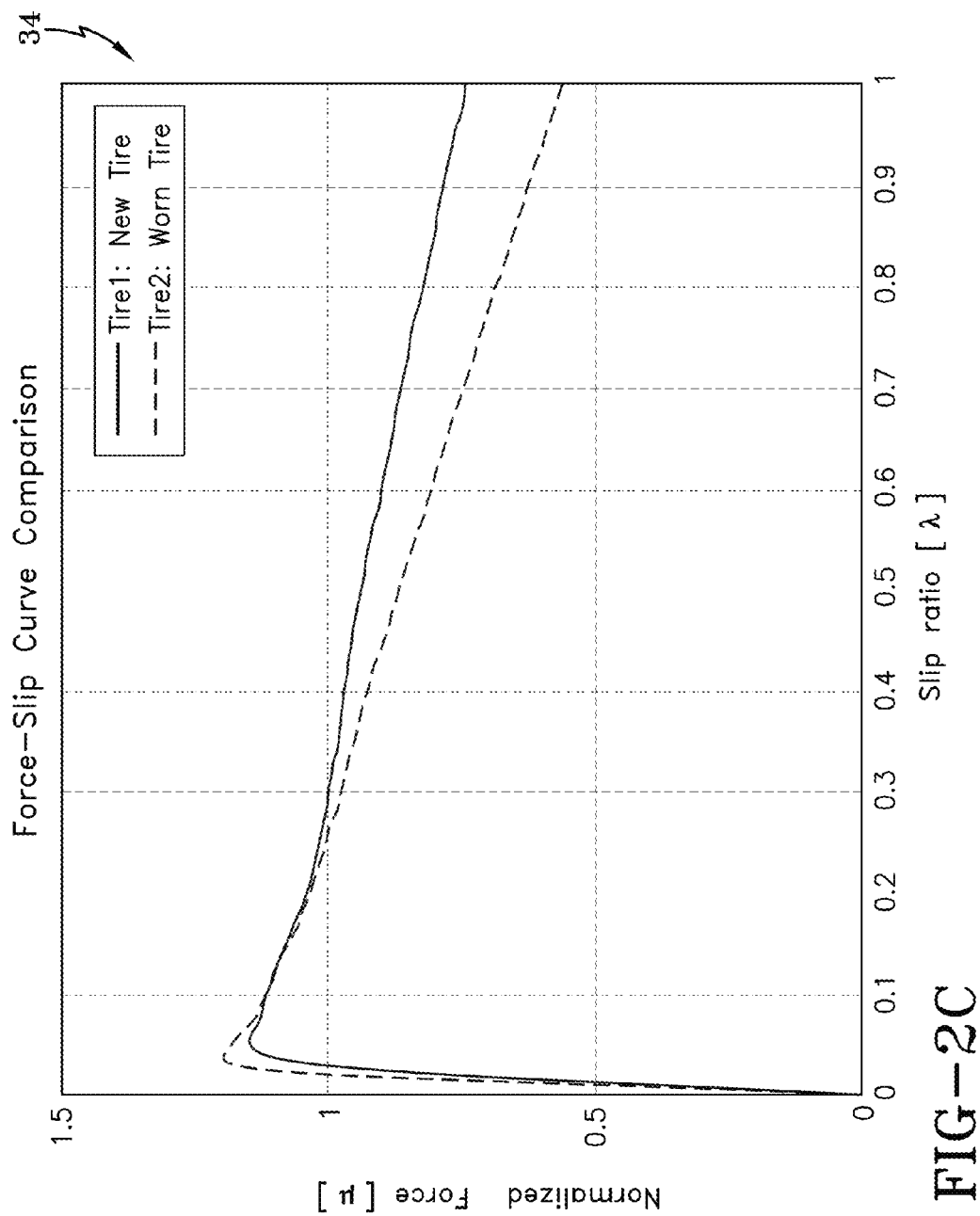
FIG. 2C is a force slip-curve comparison for a new vs. worn tire.
Figure 3:
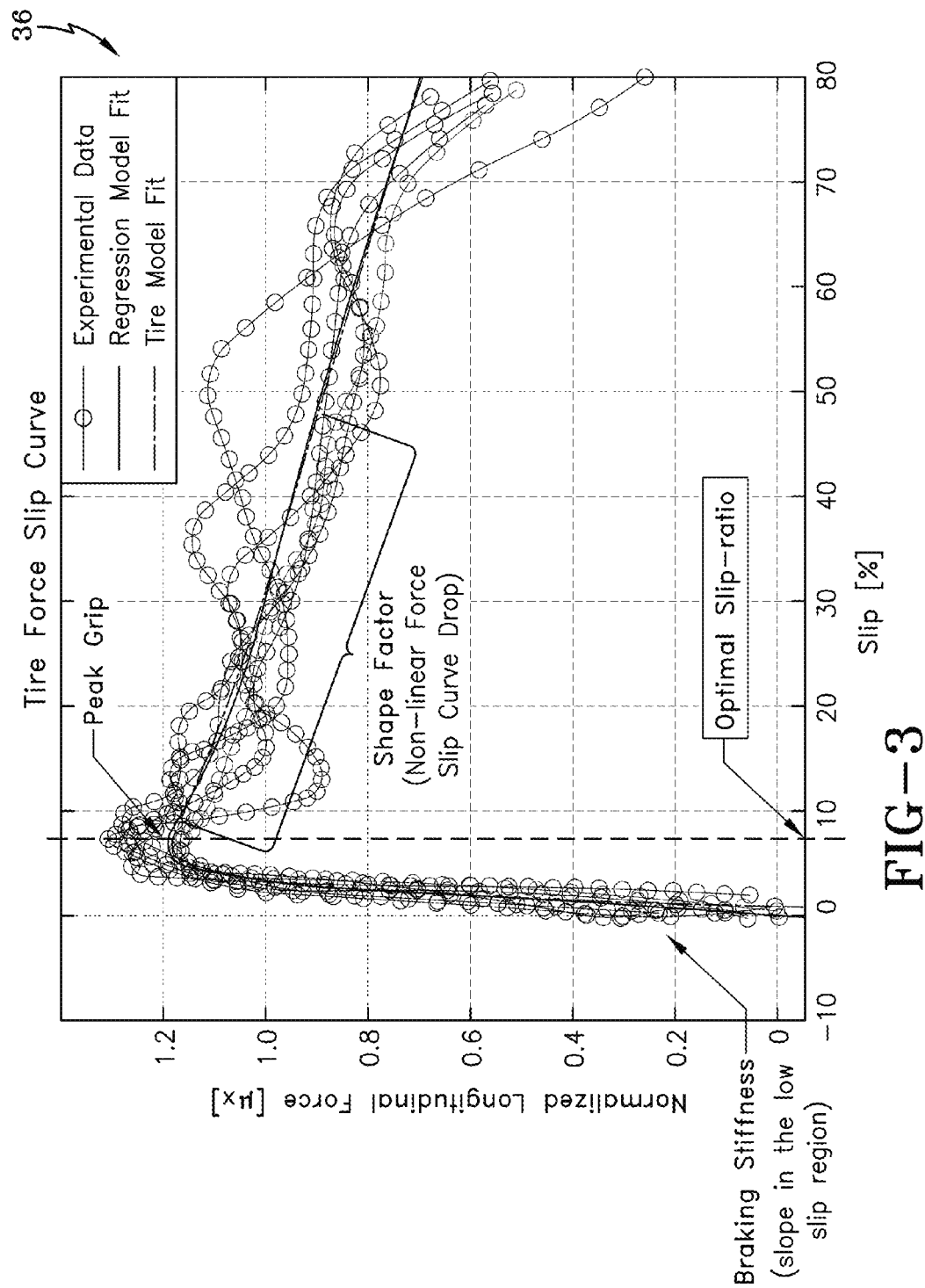
FIG. 3 is a tire force slip-curve comparing experimental data, regression model fit and tire model fit graphs.

In FIG. 2C the curves of FIGS. 2A and 2B are superimposed for comparison purposes at 34. In comparing new tire to worn, it is seen that the worn tire has a higher braking stiffness, location of the optimum slip-ratio for maximum tire force changes, i.e. moves to the left, and a noticeable change occurs in the force slip-curve shape factor, i.e. drop after peak. FIG. 3 represents a summary of sensitivity study in tire force slip-curve 34, comparing experimental data, regression model fit and tire model fit. The braking stiffness (slope in the low slip-region) region is identified as is the peak grip and shape factor (non-linear force slip-curve drop) and an optimal slip-ratio is shown.

Figure 4:
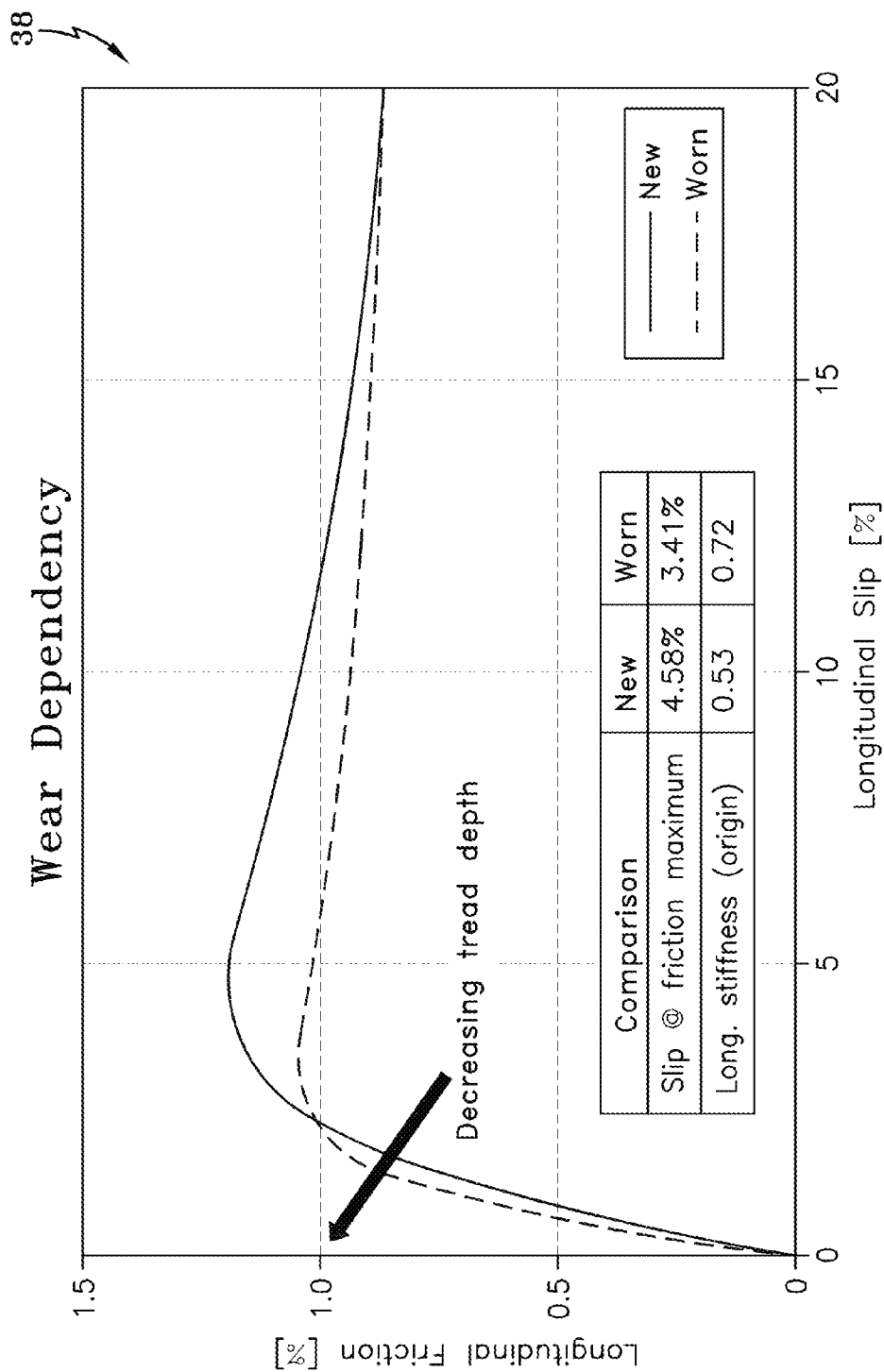
FIG. 4 is a wear dependency comparison between a new and a worn tire graphing longitudinal friction vs. longitudinal slip.

From FIG. 3 it will be seen that the tire wear state dependency levels for braking stiffness is high, for peak grip the sensitivity is low-moderate, the optimal slip-ratio is high and the shape factor is moderate-high. In FIG. 4, the curve 38 derived from testing shows by a shift to the left the effect of decreasing tread depth on friction and increase in longitudinal stiffness (origin). It is thus shown that in comparison to a new tire, a worn tire has a higher braking stiffness, the optimum slip-ratio for maximum tire force changes and shifts left and a change occurs in the shape of the mu-slip curve.

Figure 5A:
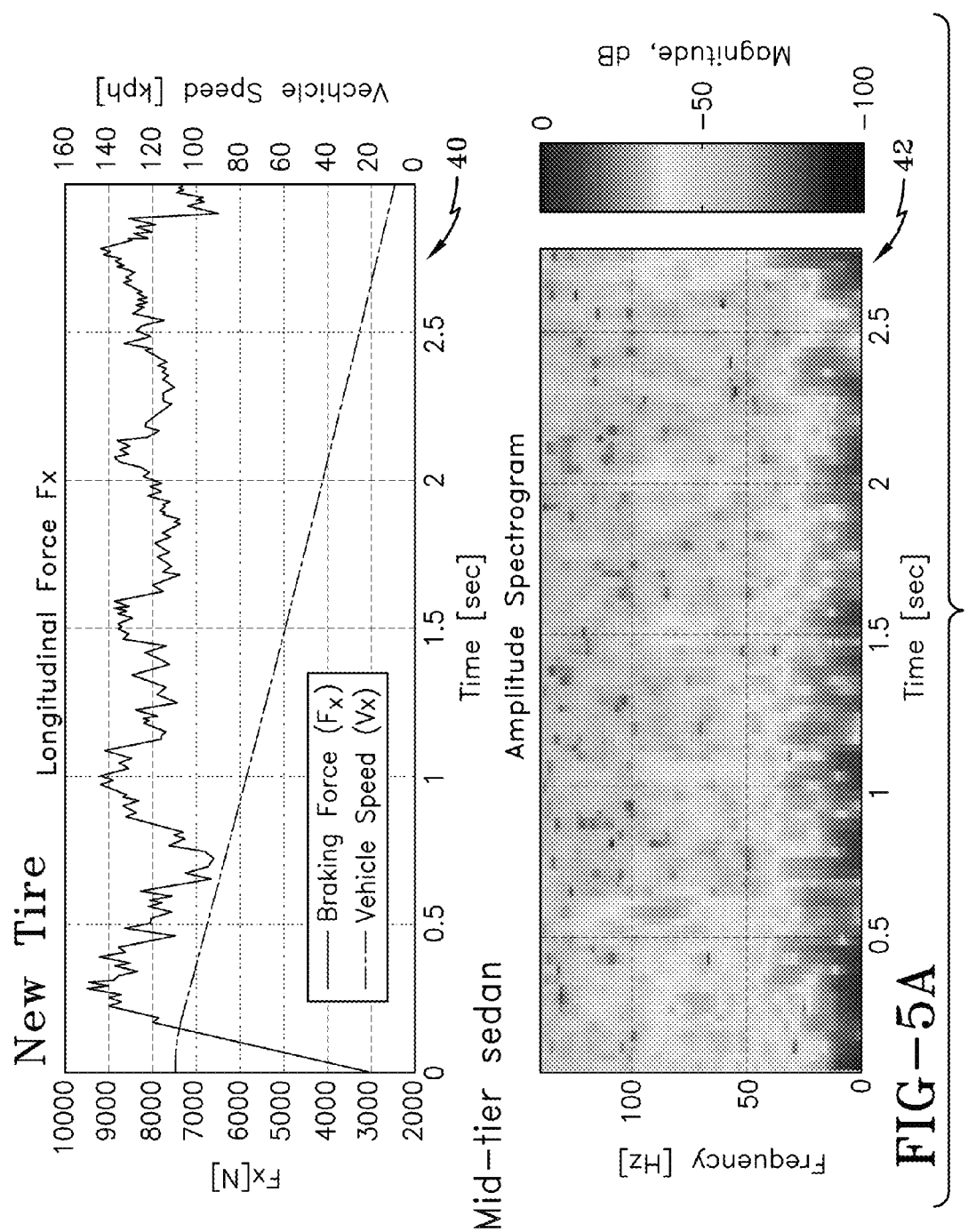
FIG. 5A is a longitudinal force graph for a new tire over time and an amplitude spectrogram for the tire mounted to a mid-tier sedan.
Figure 5B:
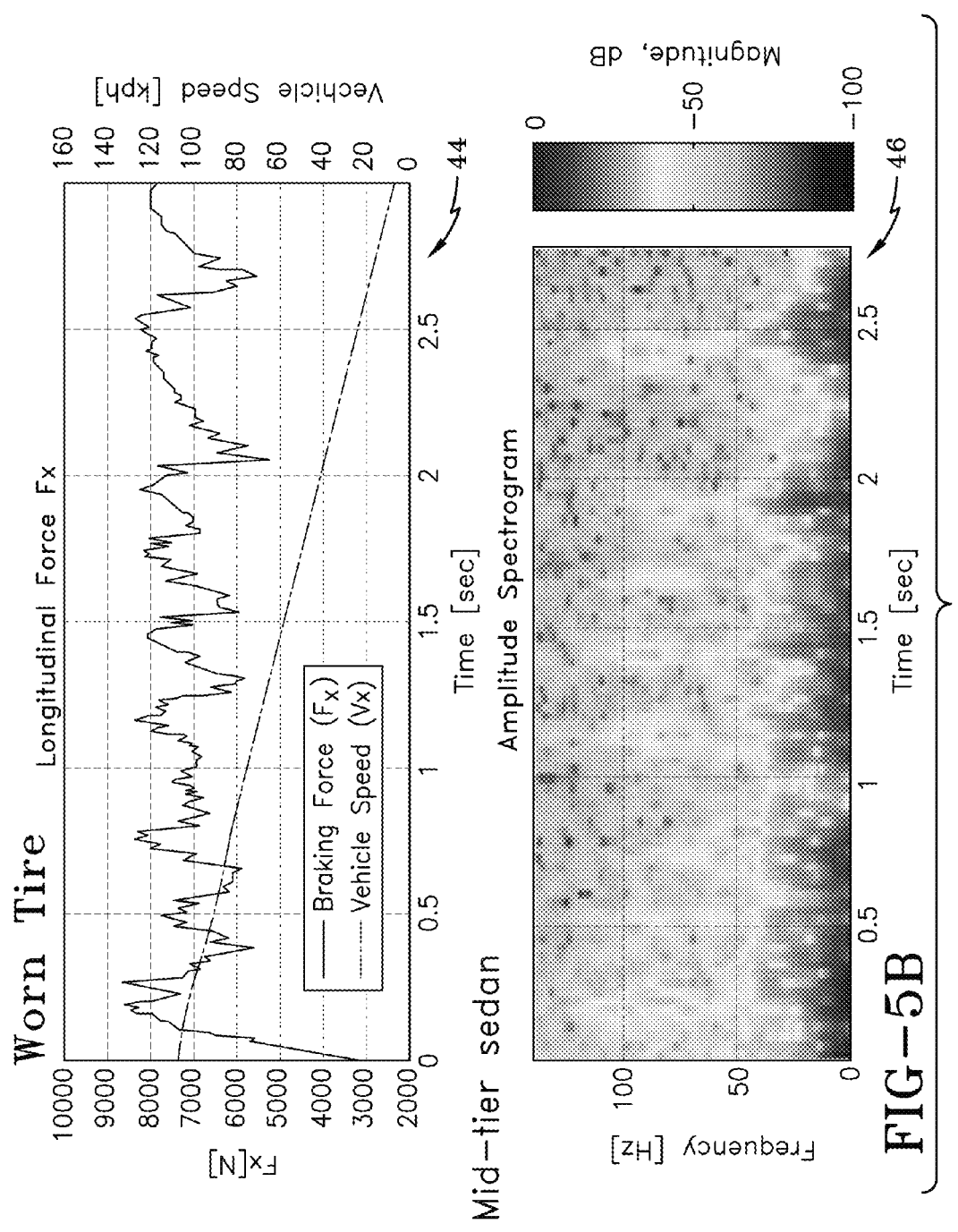
FIG. 5B is a longitudinal force graph for a worn tire over time and an amplitude spectrogram for the tire mounted to a mid-tier sedan.
Figure 6B:
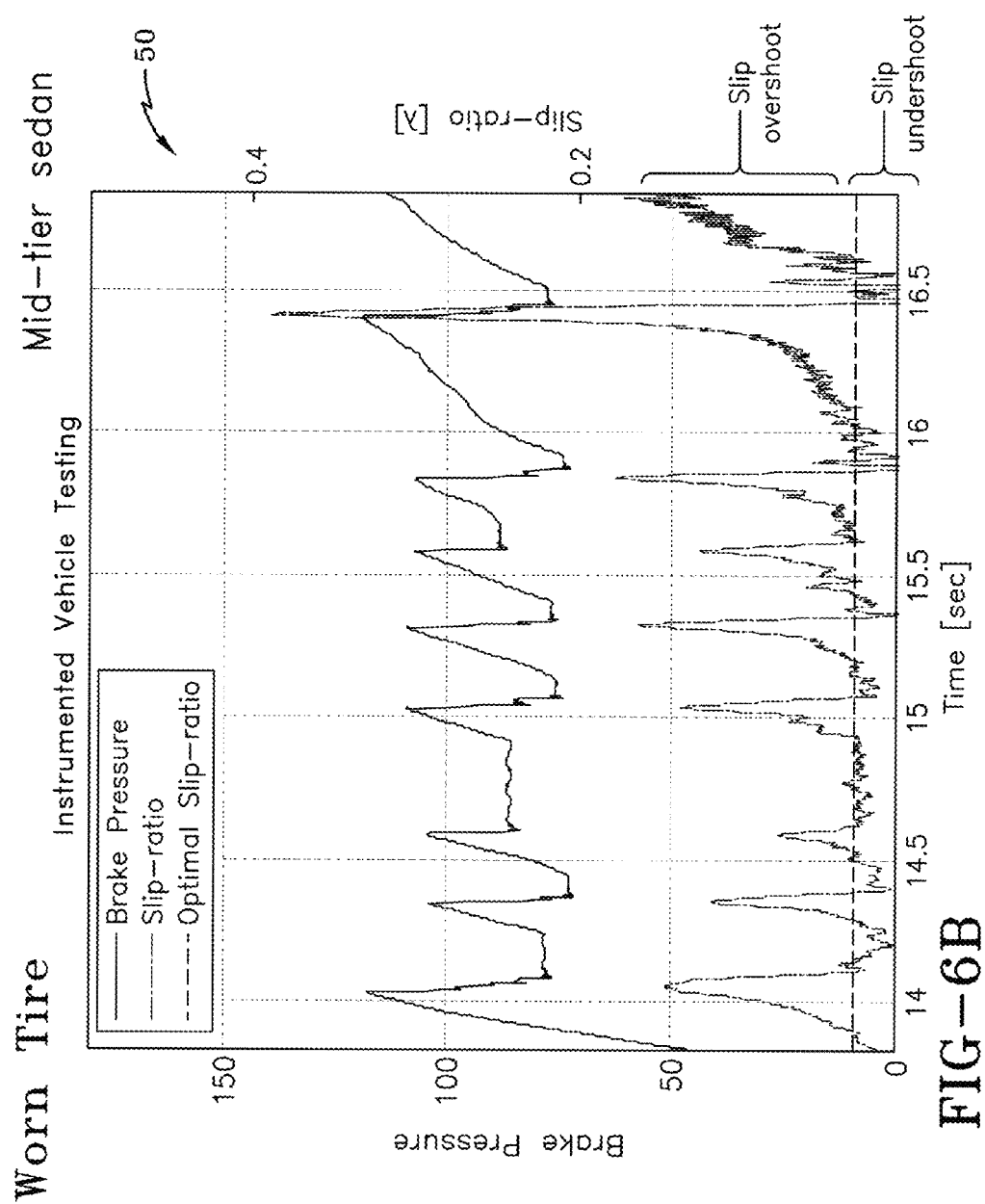
FIG. 6B is a graph of testing results similar to FIG. 6B but for a worn tire.

In FIG. 5A, curve 40 represents test results for a new tire mounted to a mid-tier sedan. The curve 40 shows braking force and vehicle speed. An amplitude spectrogram 42 shows frequency over time and magnitude dB. FIG. 5B shows the corresponding results in curve 44 for a worn tire. An amplitude spectrogram 46 shows frequency over time and magnitude dB. In FIG. 6A, testing results in curve 48 shows brake pressure, slip-ratio and optimal slip-ratio for a new tire mounted to a mid-tier sedan. FIG. 6B shows the corresponding results in curve 50 for a worn tire. It will be seen that the worn tire is less forgiving. During the pressure release cycle the tire undershoots more and during the pressure rise cycle the tire overshoots more.

Figure 7A:
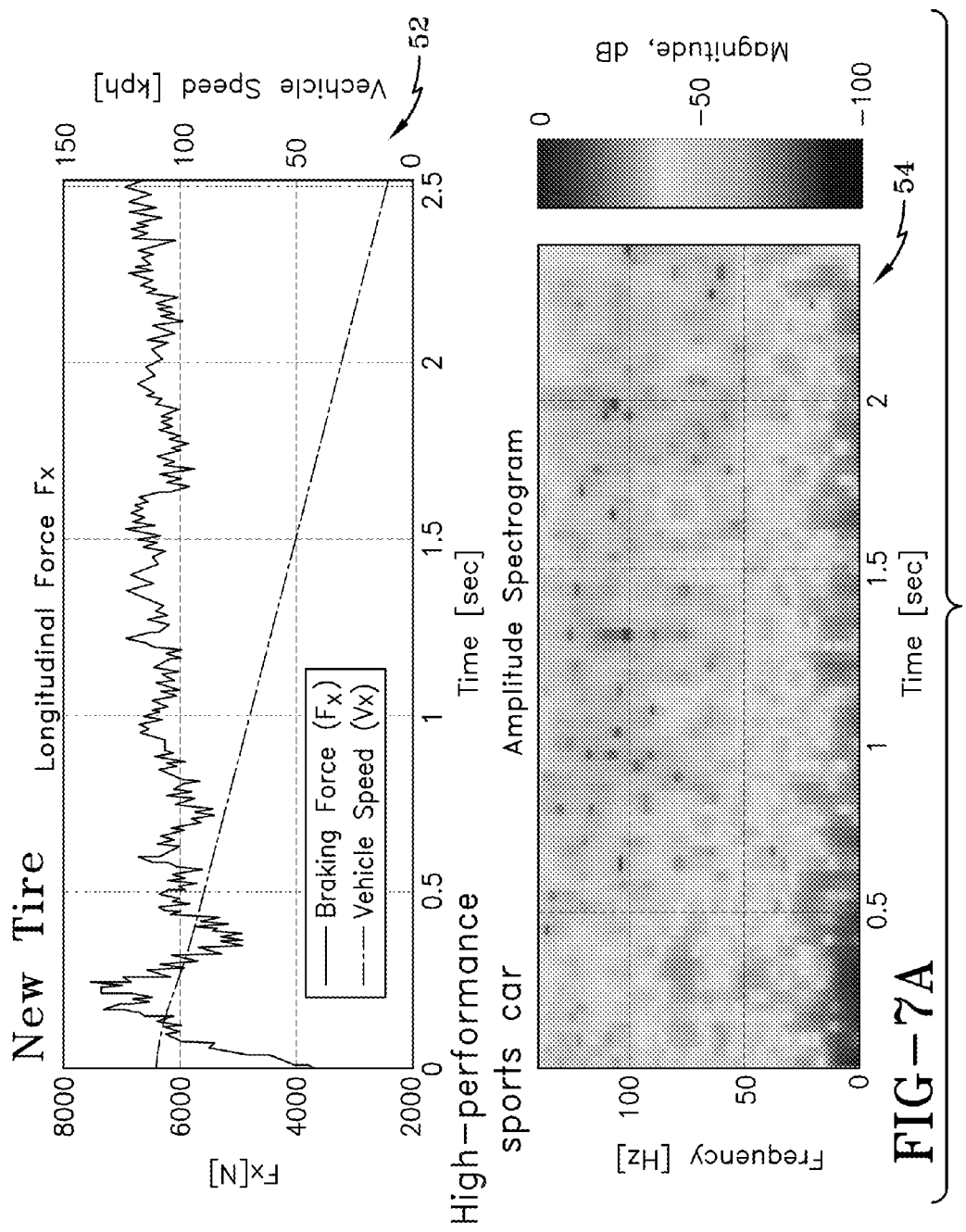
FIG. 7A is a graph of longitudinal force over time testing results for a new tire mounted to a high-performance car and an associated amplitude spectrogram.
Figure 7B:
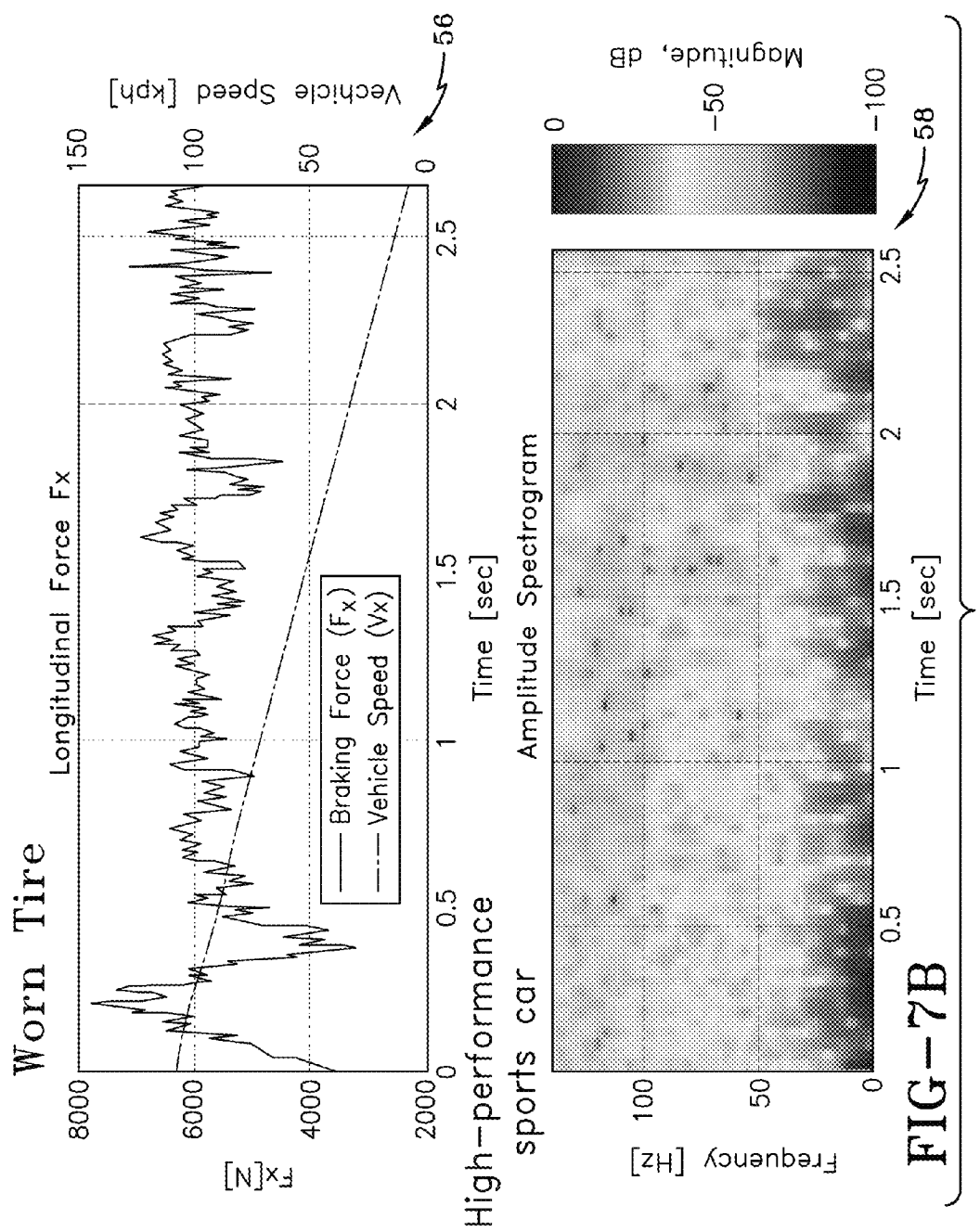
FIG. 7B is a testing results graph similar to FIG. 7A but for a worn tire.
Figure 8A:
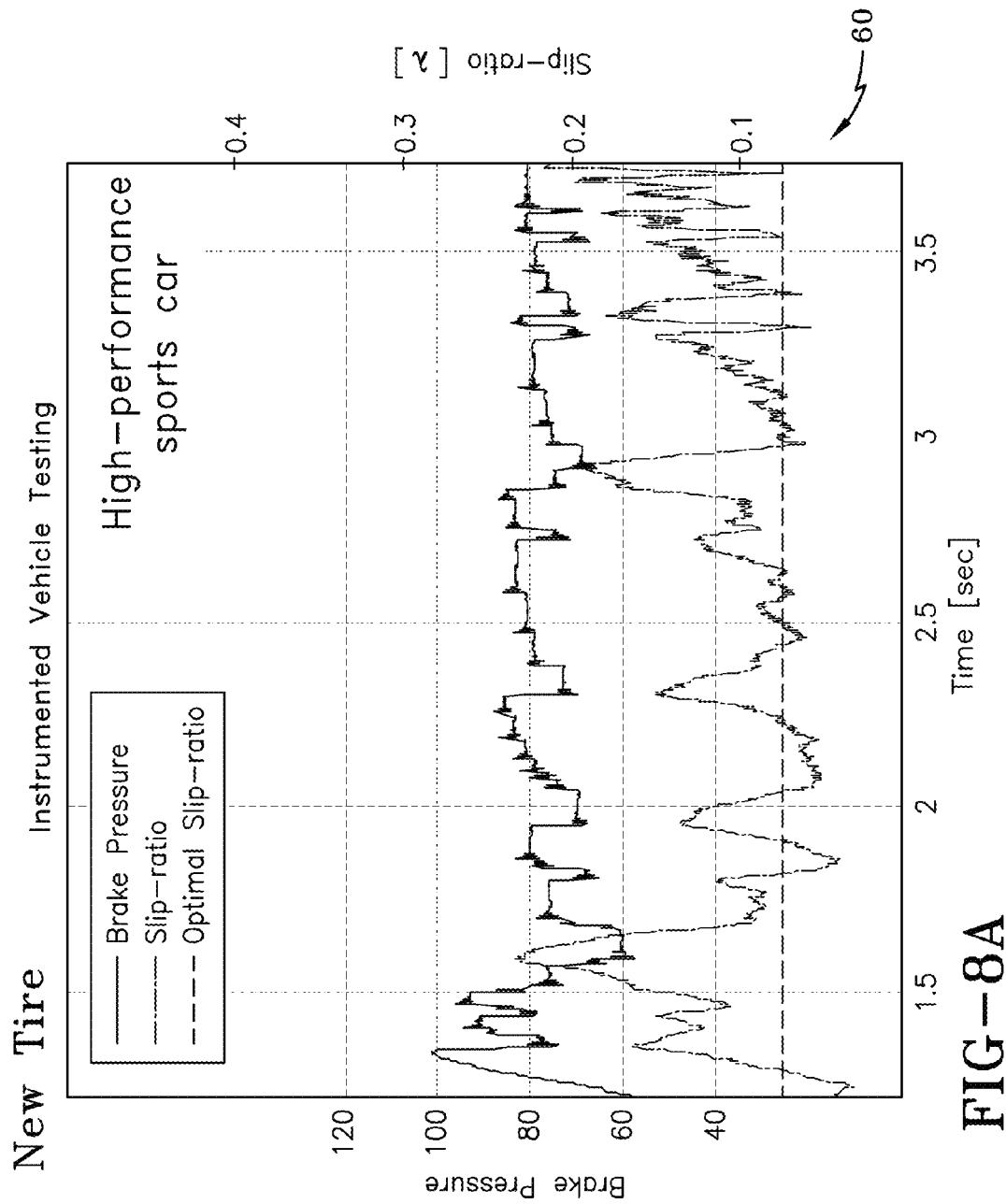
FIG. 8A is a graph showing instrumented vehicle testing results of a new tire on a high performance sports car, graphing brake pressure, slip-ratio and optimal slip-ratio over time.
Figure 8B:
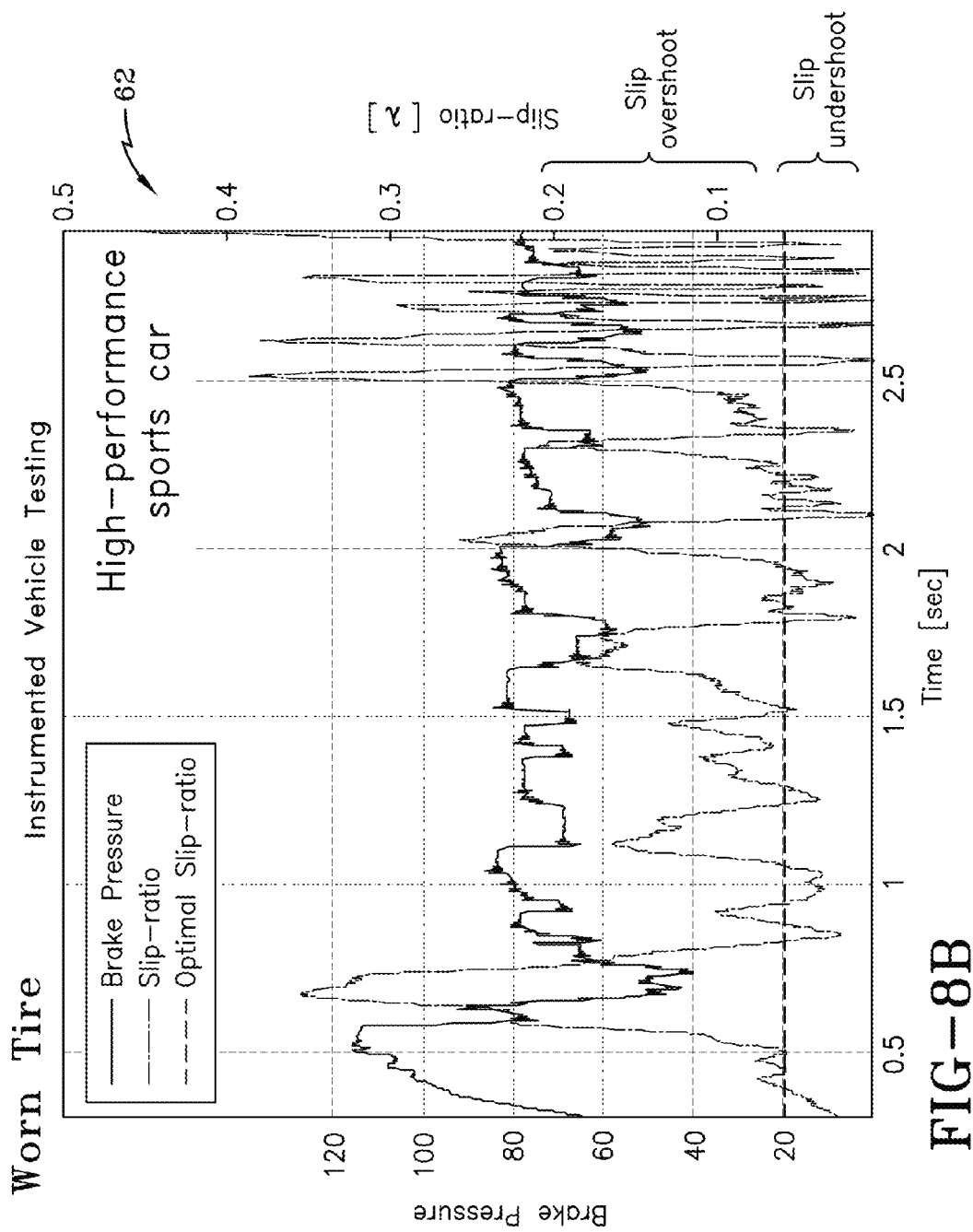
FIG. 8B is a testing results graph similar to FIG. 8A but for a worn tire.

Comparable tests were run on a new tire and a worn tire on a high-performance sports car. Test results for the new tire are shown by curve 52 and spectrogram 54 of FIG. 7A and, for the worn tire, curve 56 and spectrogram 58 of FIG. 7B. Brake pressure, slip-ratio and optimal slip-ratio test results are shown in FIG. 8A for the new tire and in FIG. 8B for the worn tire by respective curves 60 and 62. The results show that the worn tire is less forgiving. During the pressure release cycle the tire undershoots more and during the pressure rise cycle the tire overshoots more.

The subject system draws the following conclusions on the influence of tire wear state on the mu-slip curve. In the case of a worn tire:
(1) Location of the optimum slip-ratio for maximum tire force moves to the left (influence on the tire mu-slip curve).
(2) The worn tire is less forgiving as discussed above.

The system objectivizes these affects using signals available on the vehicle CAN bus by using wheel speed signals and utilizes tire-based sensor and tire ID to enhance the estimation of tire wear in view of the vehicle CAN bus signals. From the wheel speed signal analysis, in the case of a worn tire:
(1) Location of the optimum slip-ratio for maximum tire force moves to the left (influence on the tire mu-slip curve).
(2) The worn tire is less forgiving—during the pressure release cycle the tire "undershoots" more and during the pressure rise cycle the tire "overshoots" more.

In regard to the extraction of an optimum slip-ratio point, the location of the optimum slip-ratio point is characterized by determining the median slip-ratio. With regard to the use of the "less forgiving" characteristics of a worn tire, higher slip-ratio undershoot and overshoot behavior is characterized using the cumulative probability distribution function for the slip-ratio rate/speed.

Figure 9A:
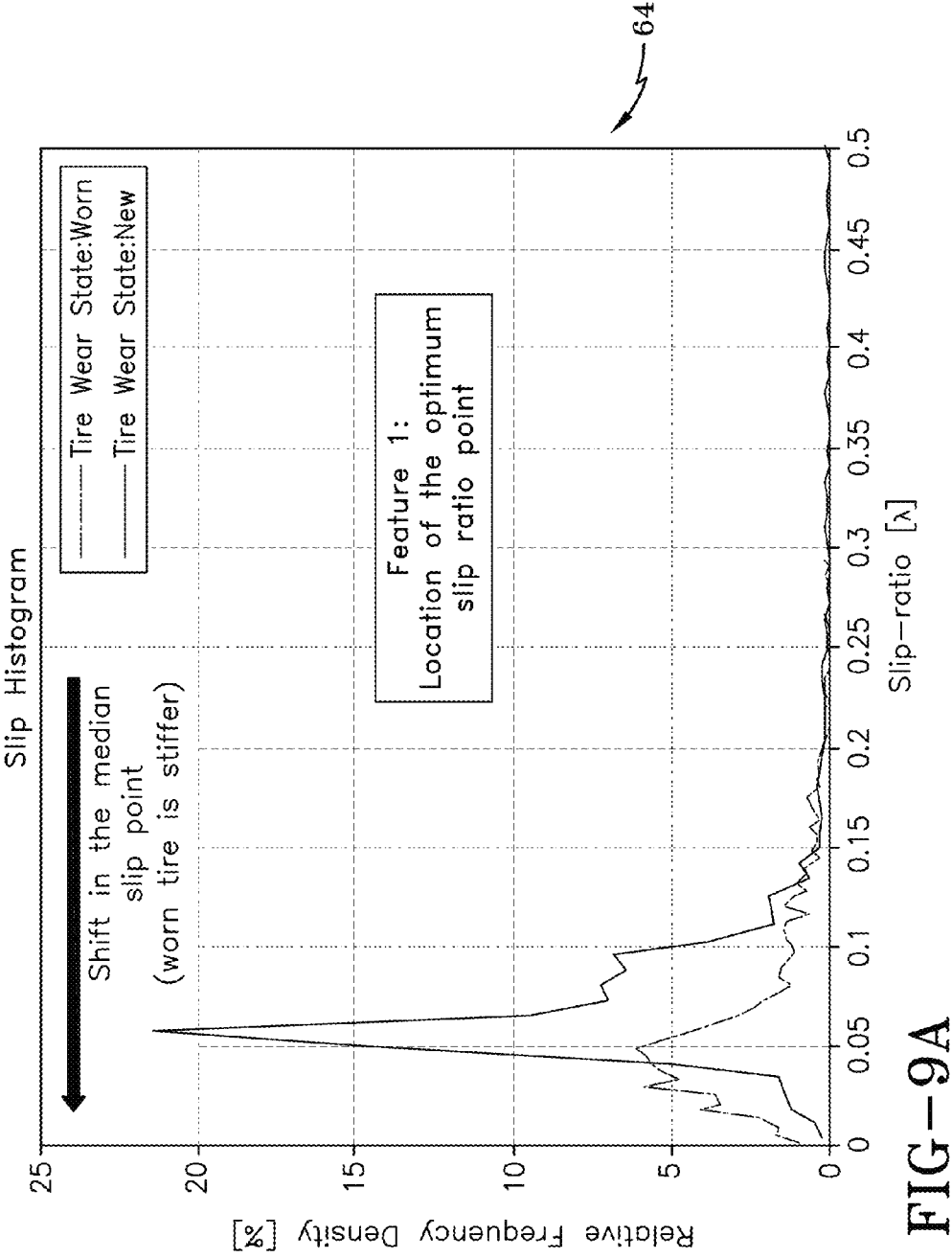
FIG. 9A is a testing results wheel speed signal analysis, showing a slip-histogram (mid-tier sedan) of frequency density vs. slip-ratio for a worn and a new tire wear states.
Figure 9B:
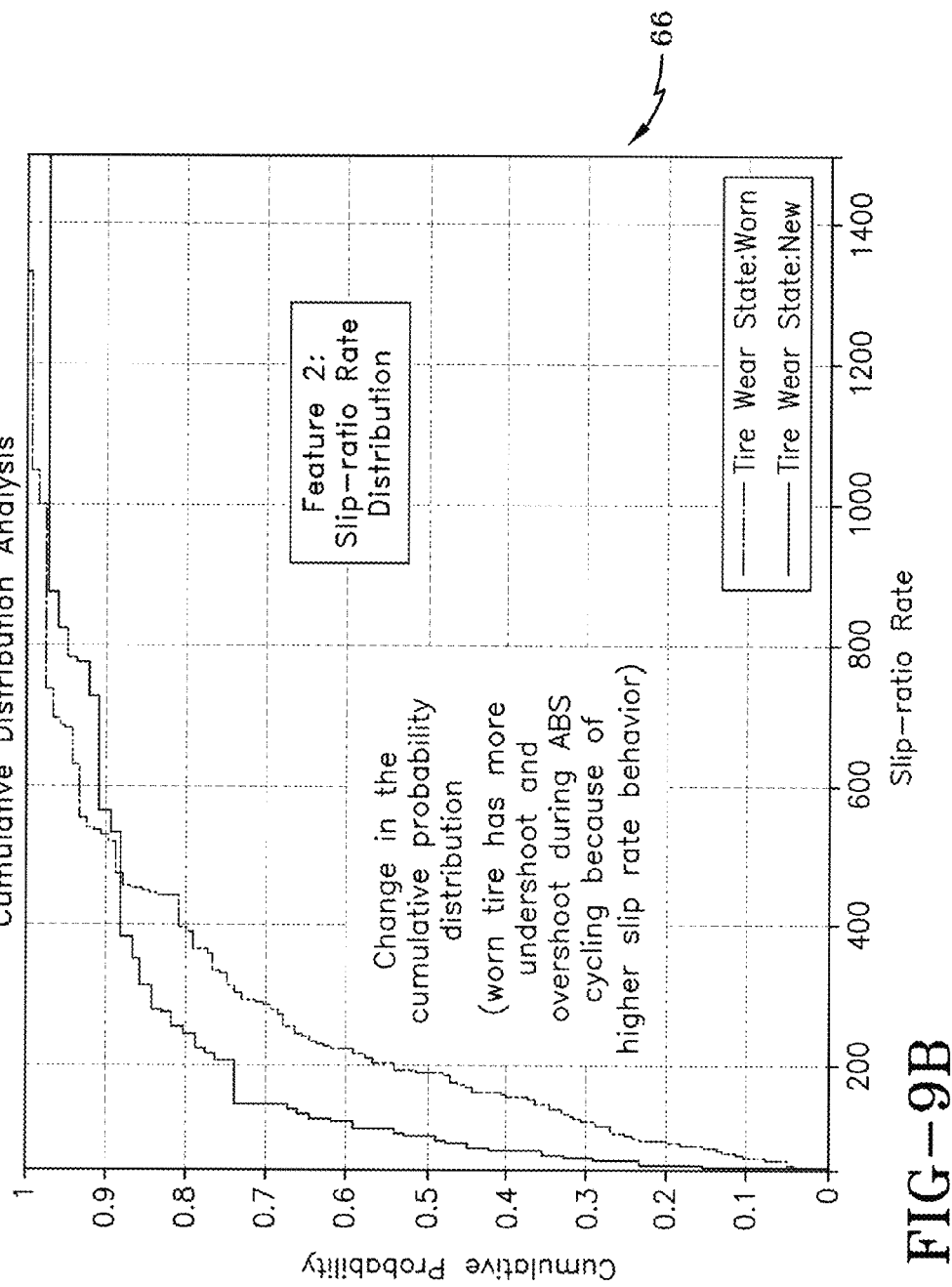
FIG. 9B is a cumulative distribution analysis graph showing slip-ratio rate distribution test results.
Figure 9C:
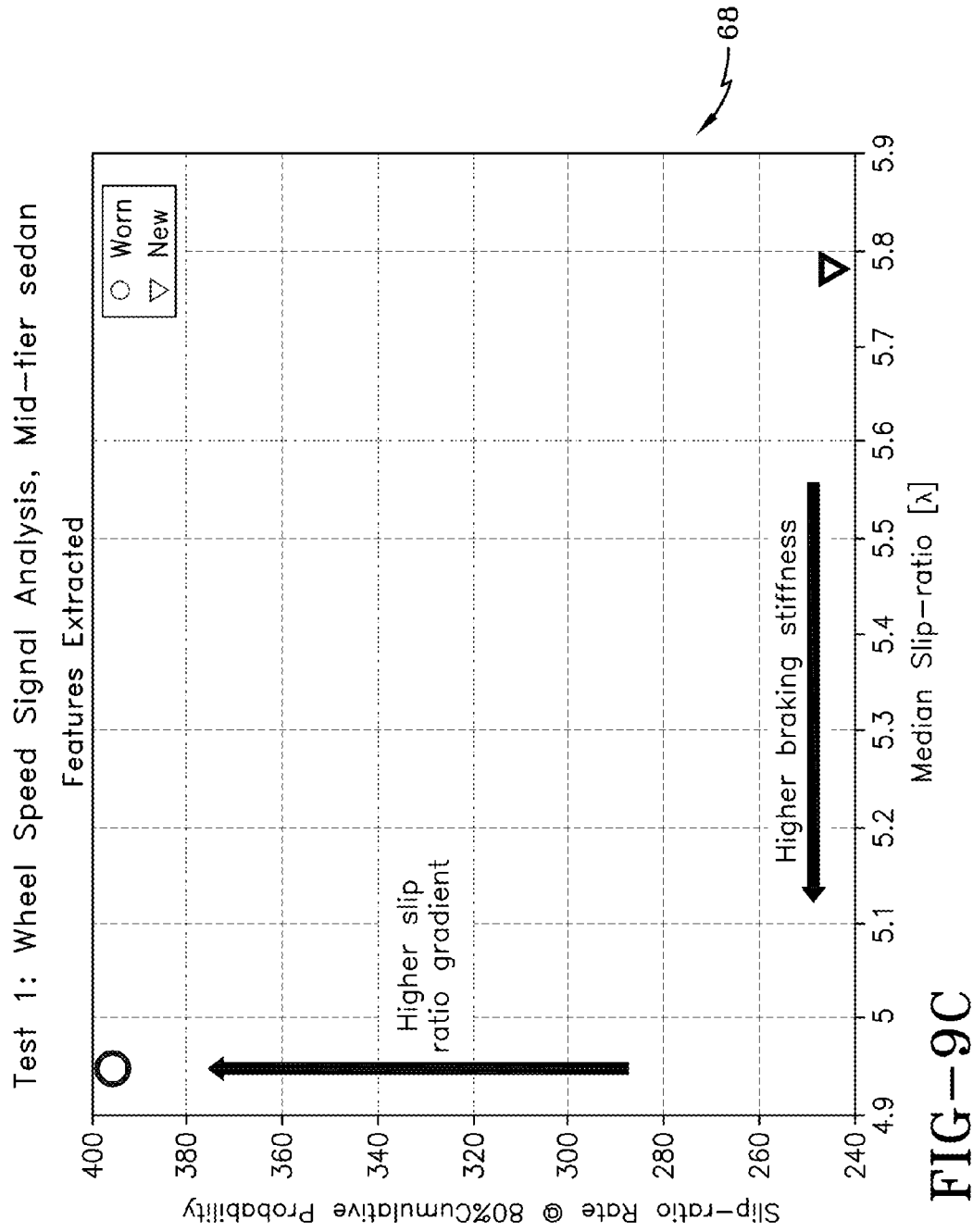
FIG. 9C is a features extracted wheel speed signal analysis graph of slip-ratio rate vs. median slip-ratio for a mid-tier sedan.

The analysis of wheel speed signals will by understood in reference to FIGS. 9A through 9C. The extraction of Feature 1, namely location of the optimum slip-point, is found in FIG. 9A showing wheel speed signal analysis for a mid-tier sedan 64. FIG. 9A shows a slip-histogram comparing new to worn tire wear states. The shift in the median slip-point (worn tire is stiffer) locates the optimum slip-ratio point. The extraction of Feature 2, namely the slip-ratio rate distribution is illustrated by the cumulative distribution graph 66 of FIG. 9B between a new and a worn tire. The cumulative probability vs. slip-ratio rate graph 66 shows change in the cumulative probability distribution caused by a worn tire having more undershoot and overshot during ABS cycling because of its higher slip-rate behavior. By analyzing the undershoot and overshoot of a new vs. worn tire, a conclusion as to the state of tire wear may be made by the measured cumulative probability.

Figure 10A:
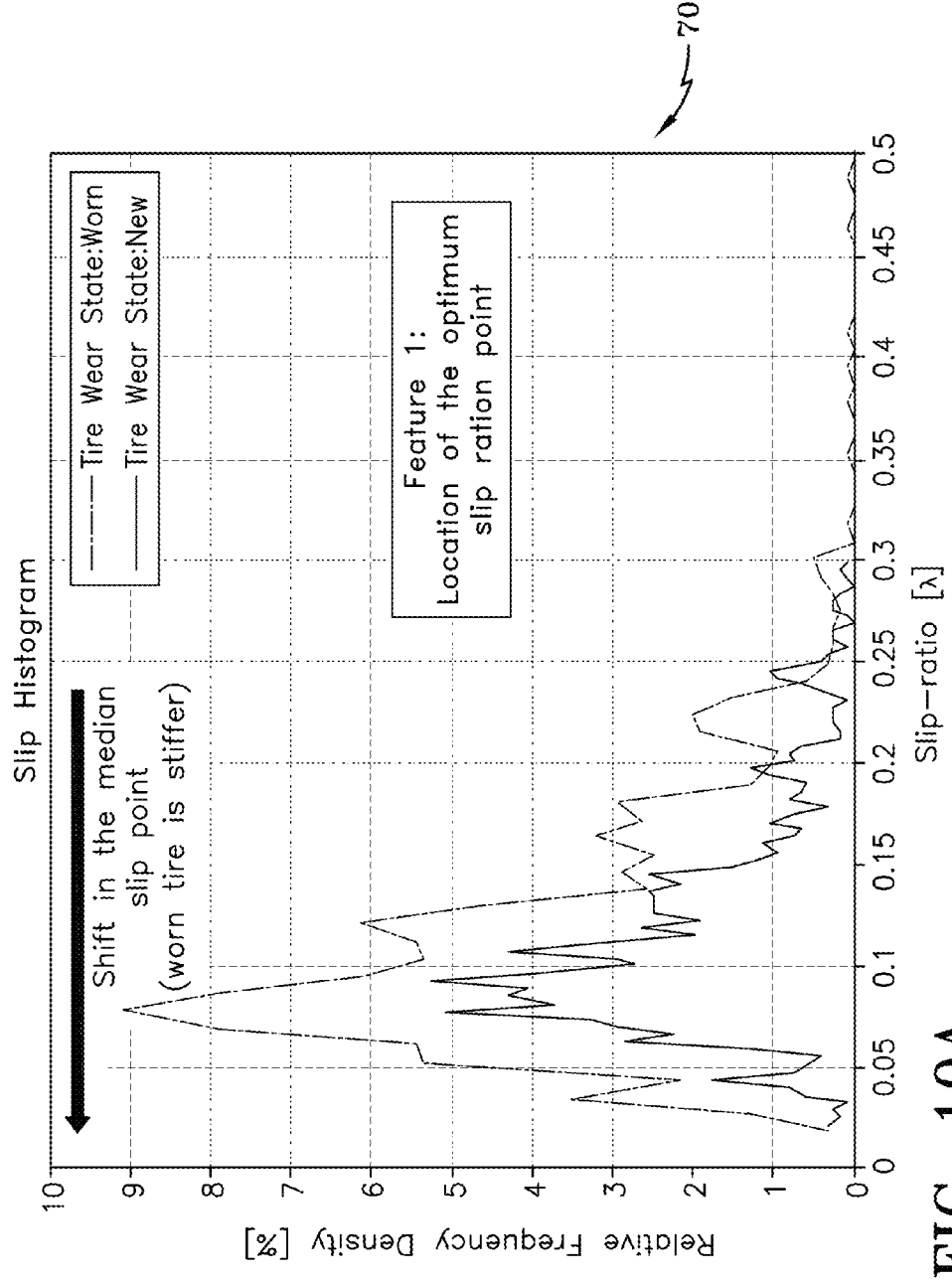
FIG. 10A is a wheel speed signal analysis test result slip-histogram for a sports car, showing worn and new tire wear states.
Figure 10B:
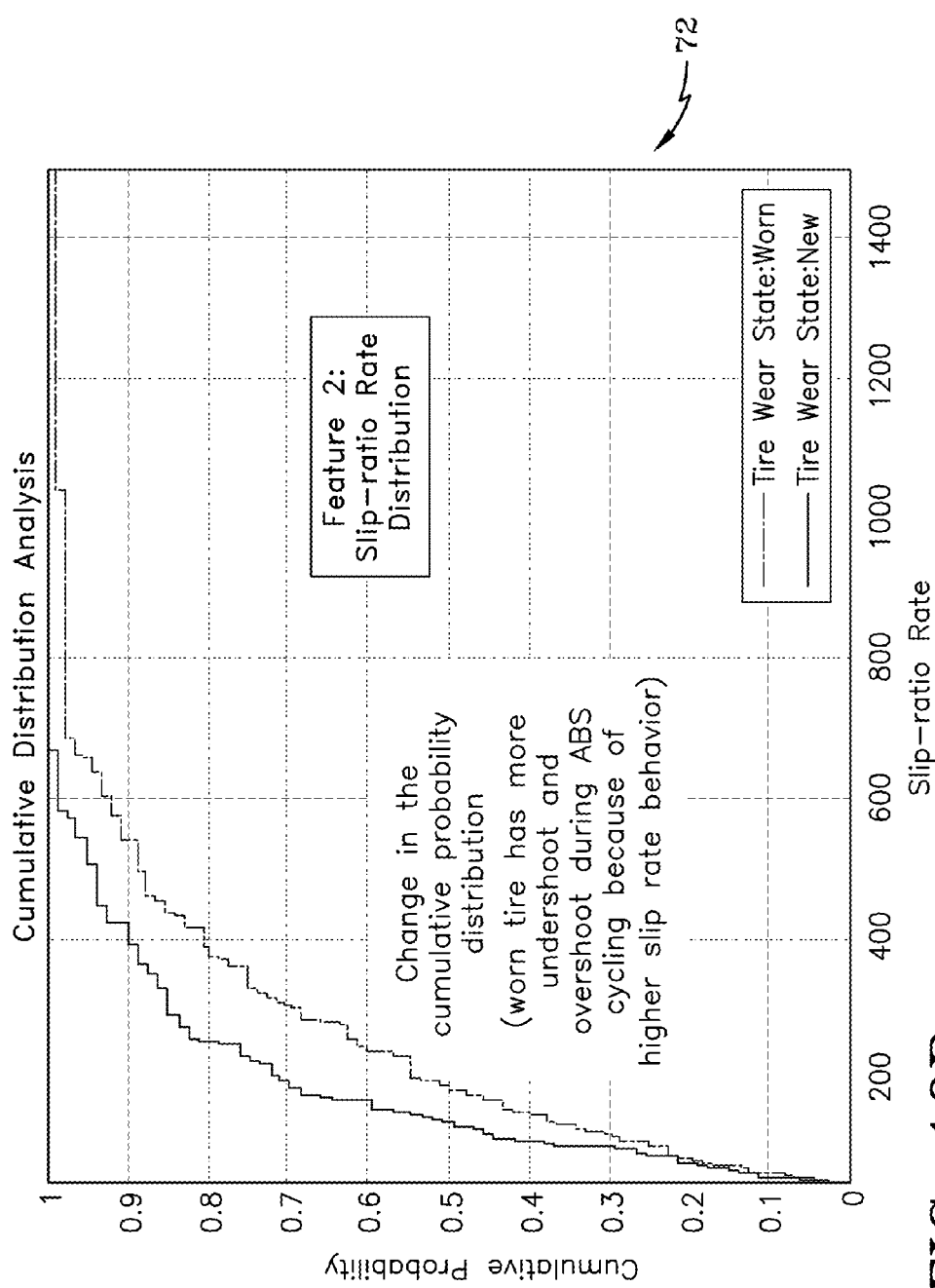
FIG. 10B is a graph of cumulative distribution analysis for a sports car, graphing cumulative probability vs. slip-ratio rate for worn and new tire wear states.
Figure 10C:
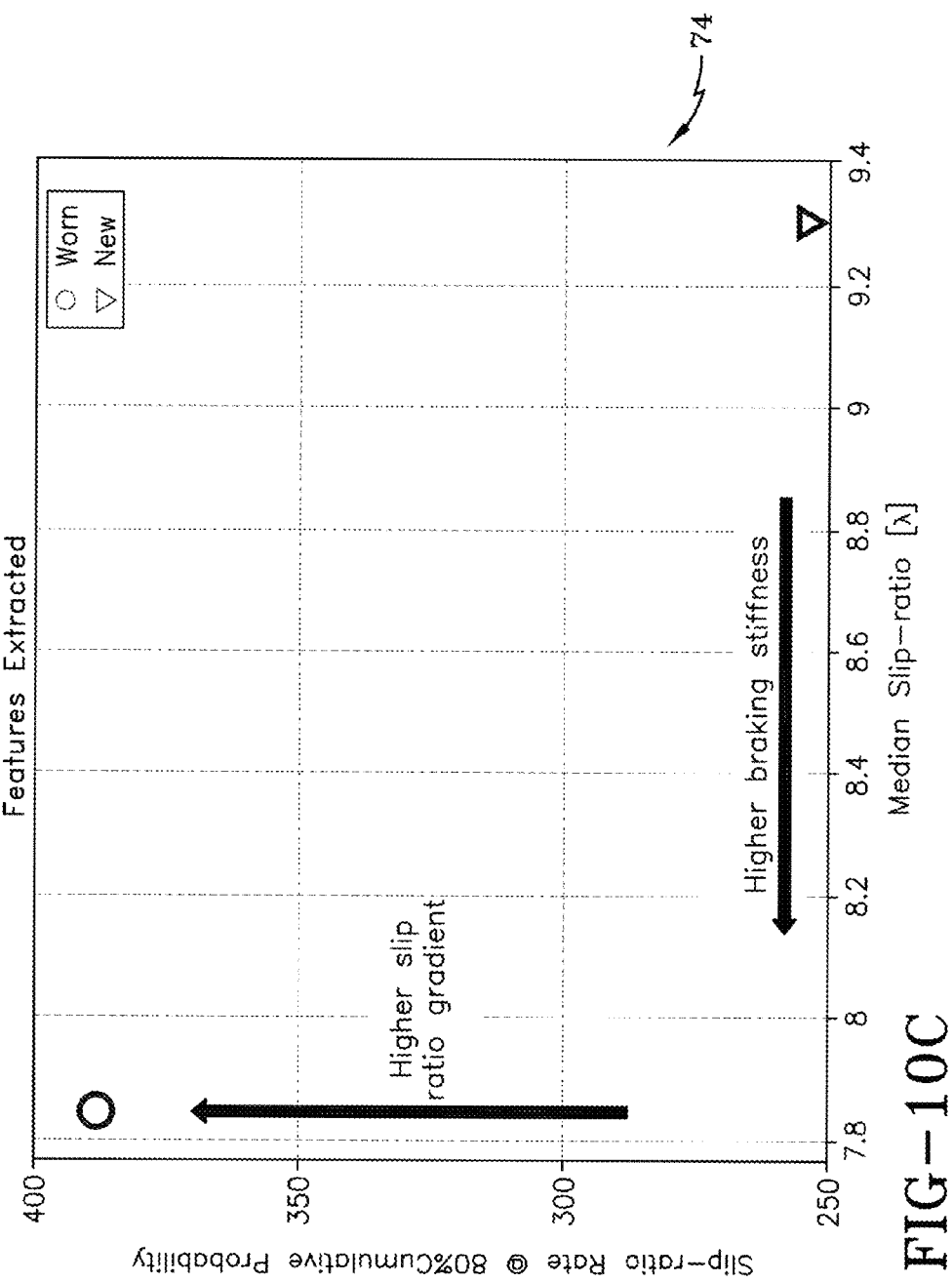
FIG. 10C is graph of worn vs. new tires mounted on a sports car and showing wheel speed signal analysis.

A summary of the features extracted is shown in graph 68 of FIG. 9C in which the worn tire is observed to have a higher slip-ratio gradient and a higher braking stiffness than that of a new tire. FIGS. 10A, 10B and 10C in respective graphs 70, 72, 74 confirm the relationships in a test conducted on new and worn tires mounted to a high-performance sports car. By identifying Feature 1 (median slip-rate) and Feature 2 (slip-rate rate at 80 percent CDF wherein "CDF" is the cumulative distribution function), the wear state of a tire may be estimated.

Figure 11:
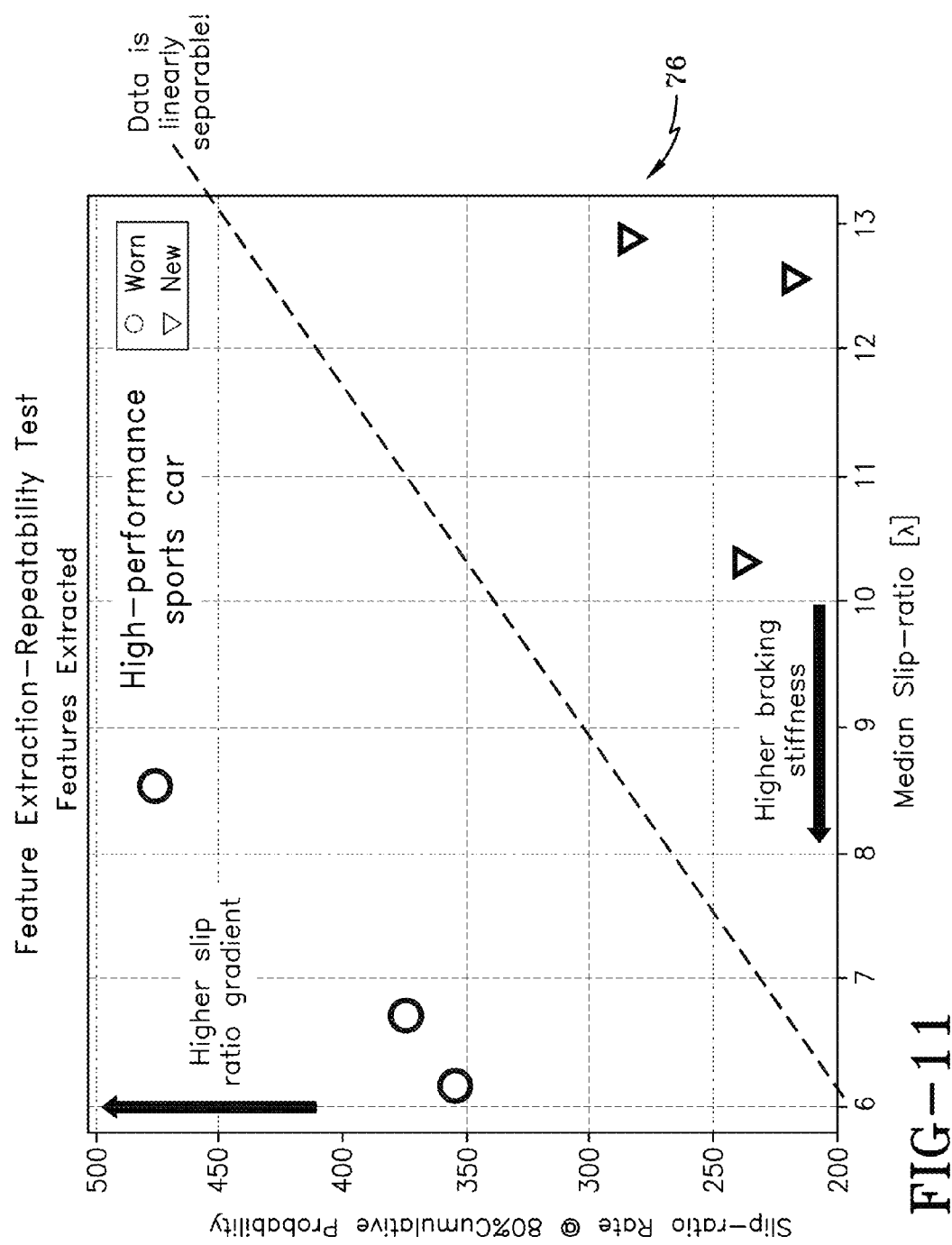
FIG. 11 is the graph of FIG. 10C with additional linear line added to show possibility of separation of data.
Figure 12:
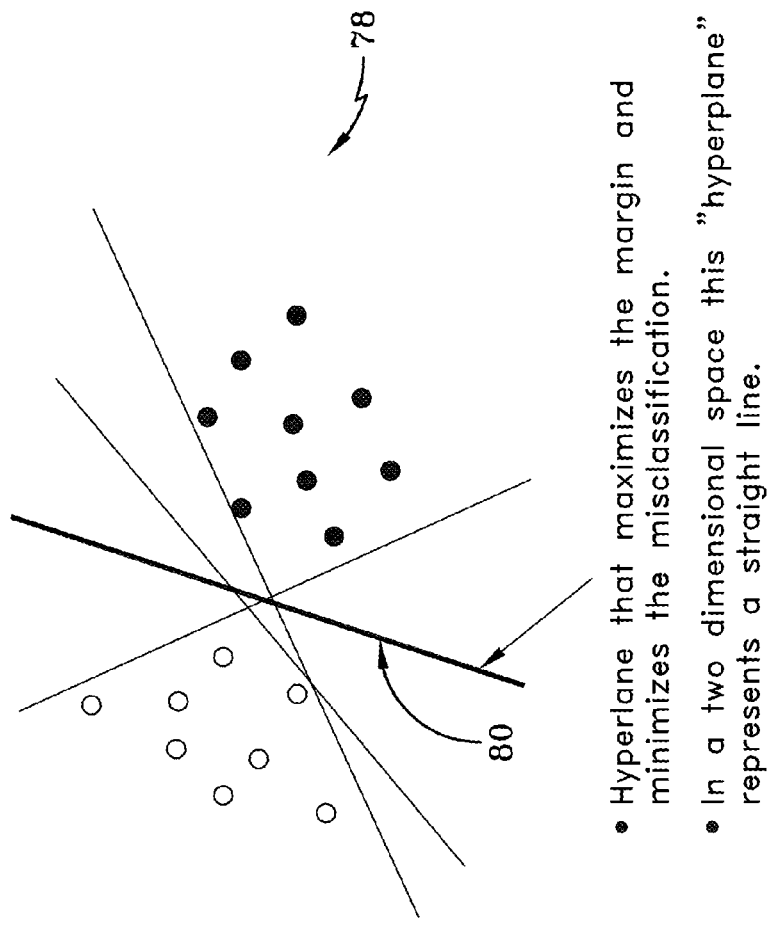
FIG. 12 is a representative depiction showing use of separating hyperplane in a manner that finds a linear separating hyperplane with a maximal margin.

A feature extraction-repeatability test is conducted and summarized in FIG. 11 graph 78. Slip-ratio rate at cumulative probability is plotted against median slip-ratio for both worn and new tires on a sports car. The data from the test indicates the worn tire as having a higher slip-ratio rate from its higher slip-ratio gradient and a lower median slip-ratio. The test results indicate the data is linearly separable. Through the use of a support vector machine (SVM), data classification is represented as indicated in FIG. 12. An optimal separating hyperplane SVM finds a linear separating hyperplane with the maximal margin. The hyperlane that maximizes the margin and minimizes the misclassification is shown at 80 which, in two dimensional space, represents a straight line.

Figure 13:
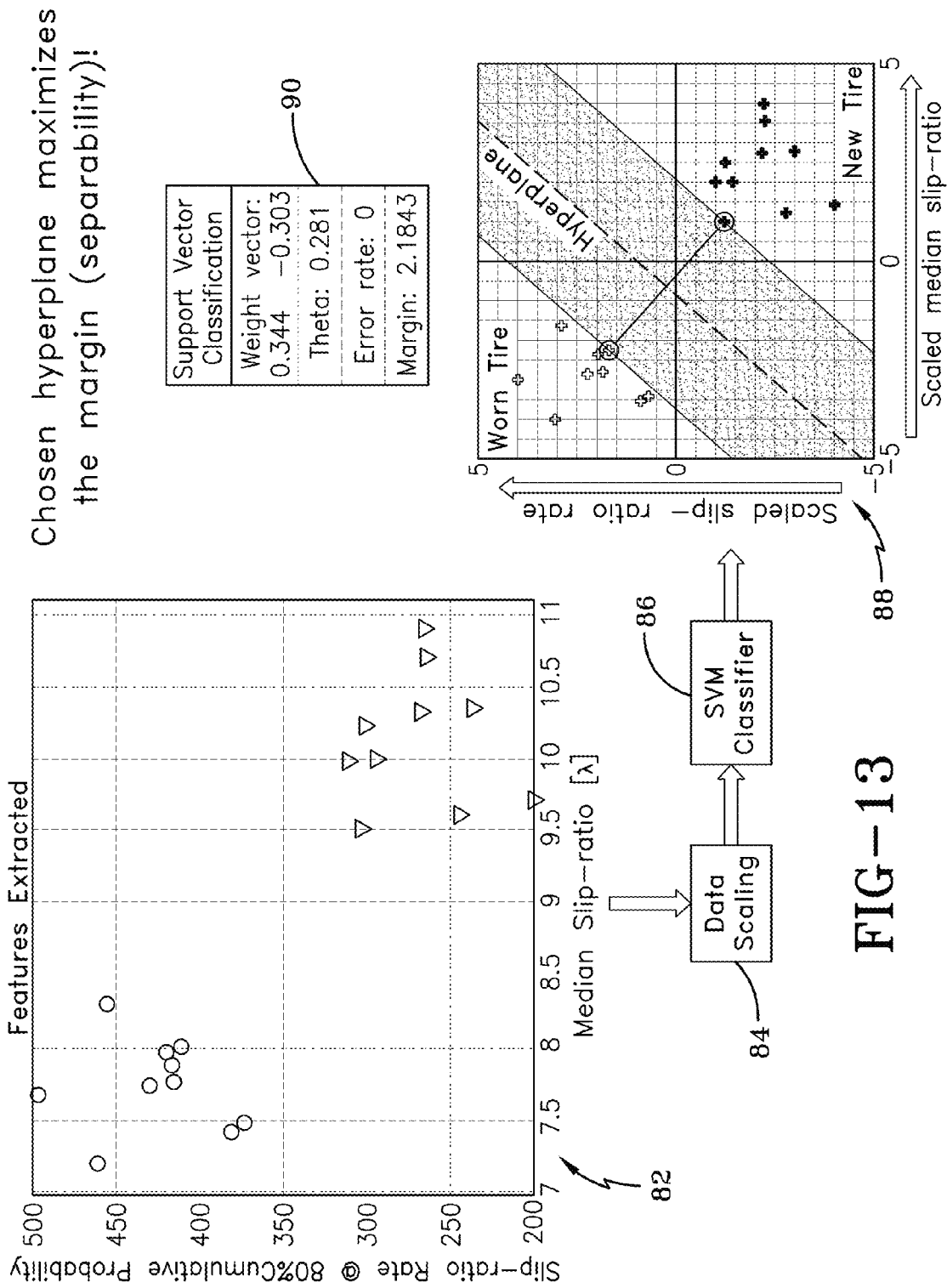
FIG. 13 is features extracted data graph and showing data scaling and SVM classifier application to yield a chosen hyperplane that maximizes margin (separability).

Use of the SVM in data classification is summarized in FIG. 13. The features extracted data from graph 82 is scaled at 84 and applied to SVM classifier 86. The resultant hyperplane graph of the data is represented by graph 88 showing scaled slip-ratio rate vs. scaled median slip-ratio. The chosen hyperplane maximizes the margin, that is separability of the data. The support vector classification is as indicated in FIG. 13 at 90.

Figure 14A:
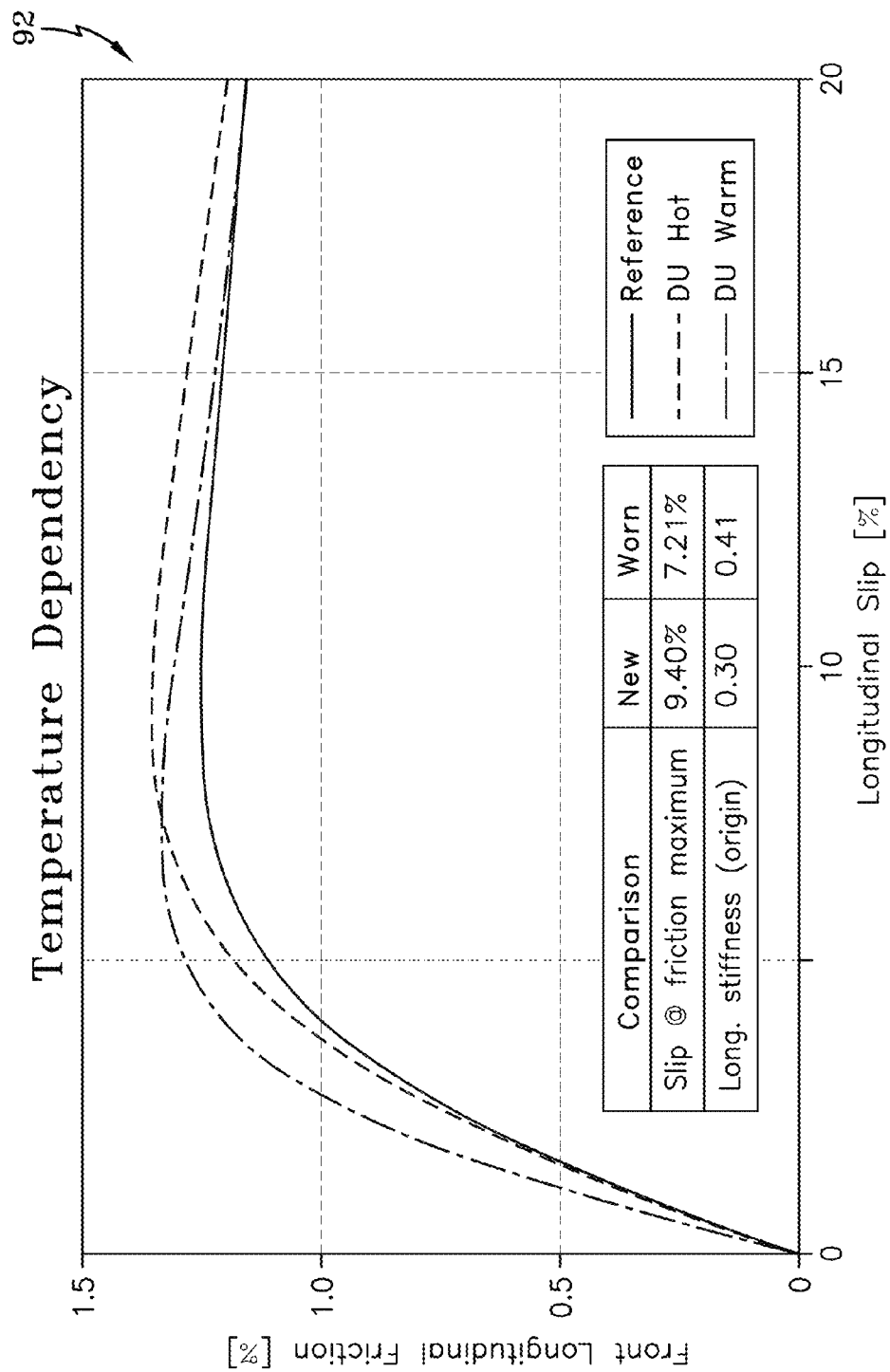
FIG. 14A is a graph showing temperature dependency between front longitudinal friction and longitudinal slip.

There are other factors that influence the tire mu-slip curve which are considered in the estimation of tire wear using feature extraction discussed above. Those factors include the temperature of the tire, the tire inflation pressure, the tire construction by manufacturer make and tire type. The graph 92 of FIG. 14A shows the temperature dependency by graphing slip at friction maximum and longitudinal stiffness (origin) for new and worn tires at reference, hot and warm temperatures. The influence of temperature on the extracted features is confirmed.

Figure 14B:
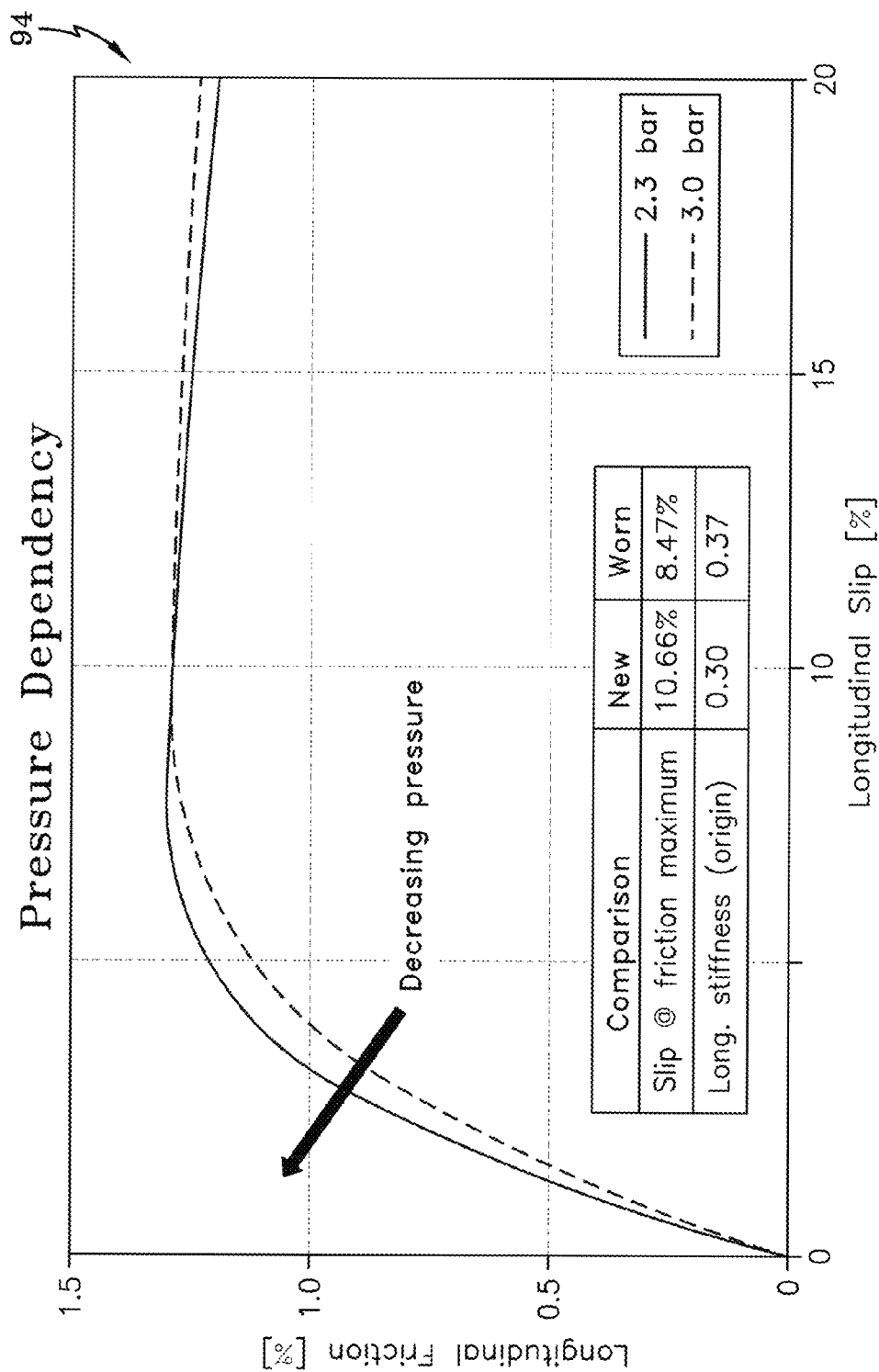
FIG. 14B is a graph showing pressure dependency between longitudinal friction and longitudinal slip.

The dependency of tire pressure on the mu-slip curve is demonstrated by the graph 94 of FIG. 14B. Varying tire pressures causes a shift in the curve for both new and worn tires. Likewise tire construction has an influence on the mu-slip curve for both new and worn tires. In FIG. 14C, test results are shown by curve 96. The test was conducted on summer vs. winter new and worn tires; the new tire curve shown by FIG. 14C. Differences between summer and winter constructed tires is shown in the table presented in FIG. 14C. As used herein, "tire construction" not only refers to the type of application in which a tire is intended to be used, but also the manufacturer of the tire. Summer tires between different manufactures will have different dependency influence on the mu-slip curve. Accordingly, tire ID as explained will, by identifying the particular tire being evaluated, enable construction type and manufacturer to be identified. In so doing, the particular effect of the tire ID on the mu-slip curve may be ascertained.

In summary, braking stiffness sensitivities are as follows. A decreasing tread depth (new to worn) increases braking stiffness. Decreasing pressure likewise increases braking stiffness. Increasing temperature decreases braking stiffness. Construction influence, summer to winter, decreases braking stiffness. The degree and magnitude of the increase and decrease in braking stiffness in any given tire may be empirically determined and placed in an accessible database. Upon identifying a tire through tire ID recognition, the influence of tread depth, pressure, temperature, and construction may be determined by consulting the prepared database.

Tire-attached TPMS sensors are used by the subject wear estimation system. Such TPMS sensors present opportunity to compensate for the influence of these factors.

Referring to FIG. 15, the subject system for indirectly estimating tire wear state is shown at 98. The vehicle 10 is supported by tires 12 that are equipped with a tire-attached TPMS module 24. The TPMS module 24 includes a sensor for determining tire inflation pressure, and a tire temperature sensor, and tire ID from which tire type, construction and manufacture may be determined. "TPMS+" is used to refer to the use of tire-based sensors to generate pressure and temperature measurements as well as tire ID (hence the use of "+" nomenclature) to identify the tire. The pressure, temperature, and tire ID are collectively referred to as "tire-based sensor inputs". The vehicle 10 is equipped with an on-vehicle sensor for generating a wheel speed signal accessible via the vehicle CAN bus 100 in conventional manner. From the wheel speed signal, features are extracted 102, namely slip-ratio rate at 80 percent cumulative probability and median slip-ratio ($\lambda$). A support vector classification is made from the data obtained from the feature extraction as represented by graph 105. A worn tire will generate data represented as shown and a new tire data represented by the distribution shown. The difference in classification will thus be indicative as to whether the tire is worn or new, i.e. the tire wear state 106. The tire-based sensor inputs from the TPMS+module is used to compensate for the influence of pressure, temperature and tire construction.

Figure 16A:
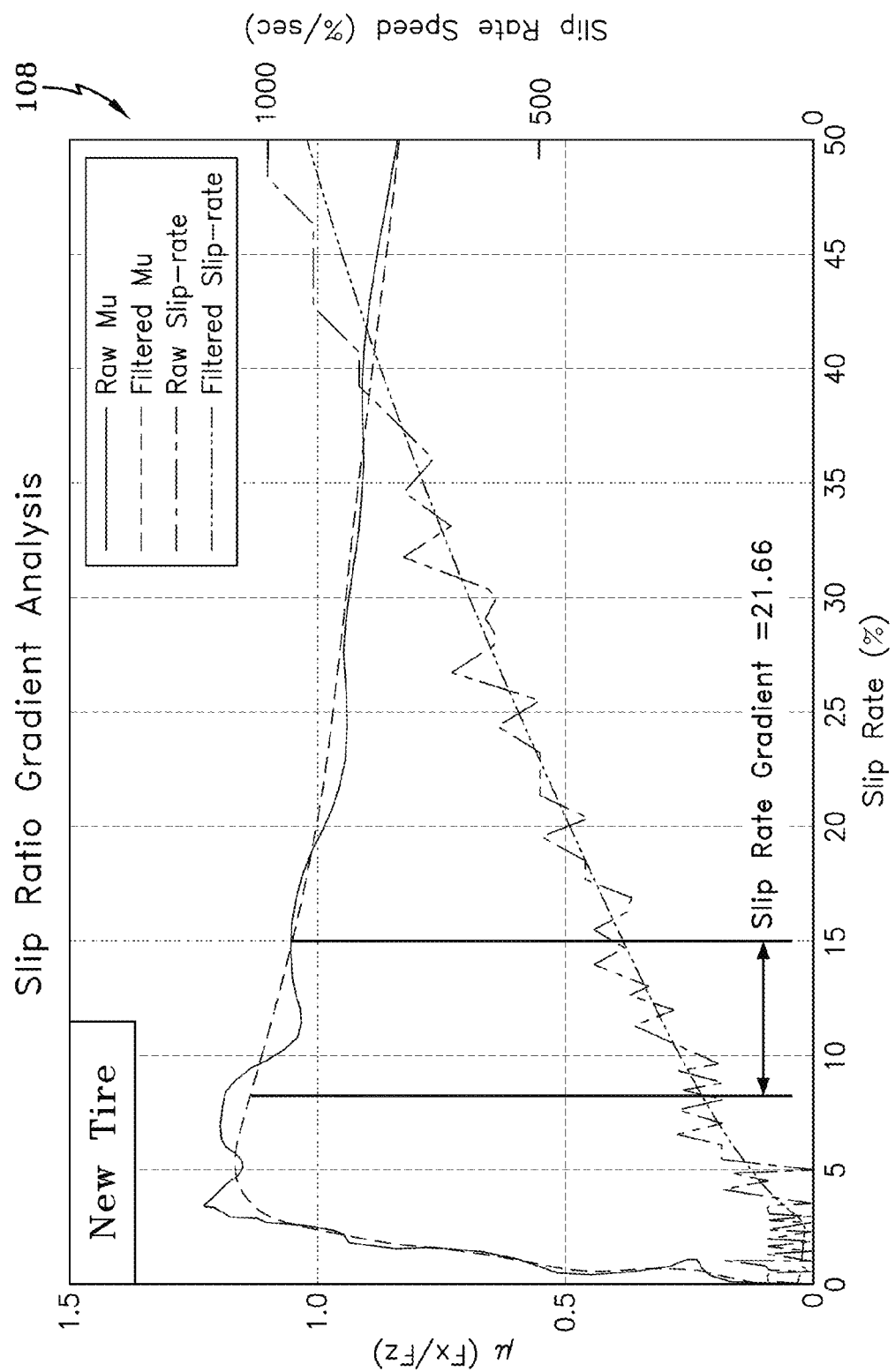
FIG. 16A is a graph showing slip-ratio gradient analysis in a new tire and showing raw vs. filtered mu and slip-rate variance.
Figure 16B:
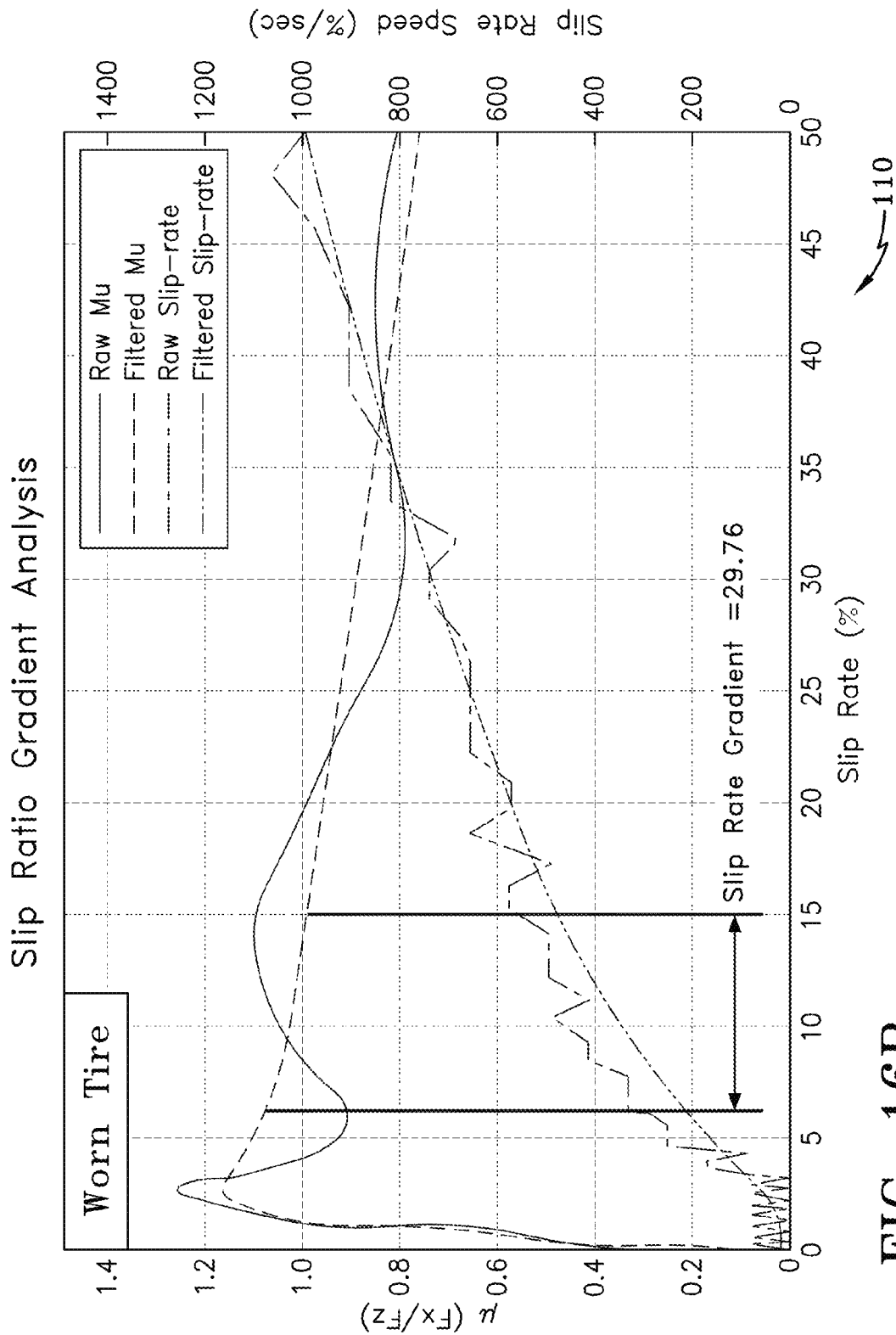
FIG. 16B is a graph similar to FIG. 16A but for a worn tire.
Figure 17A:
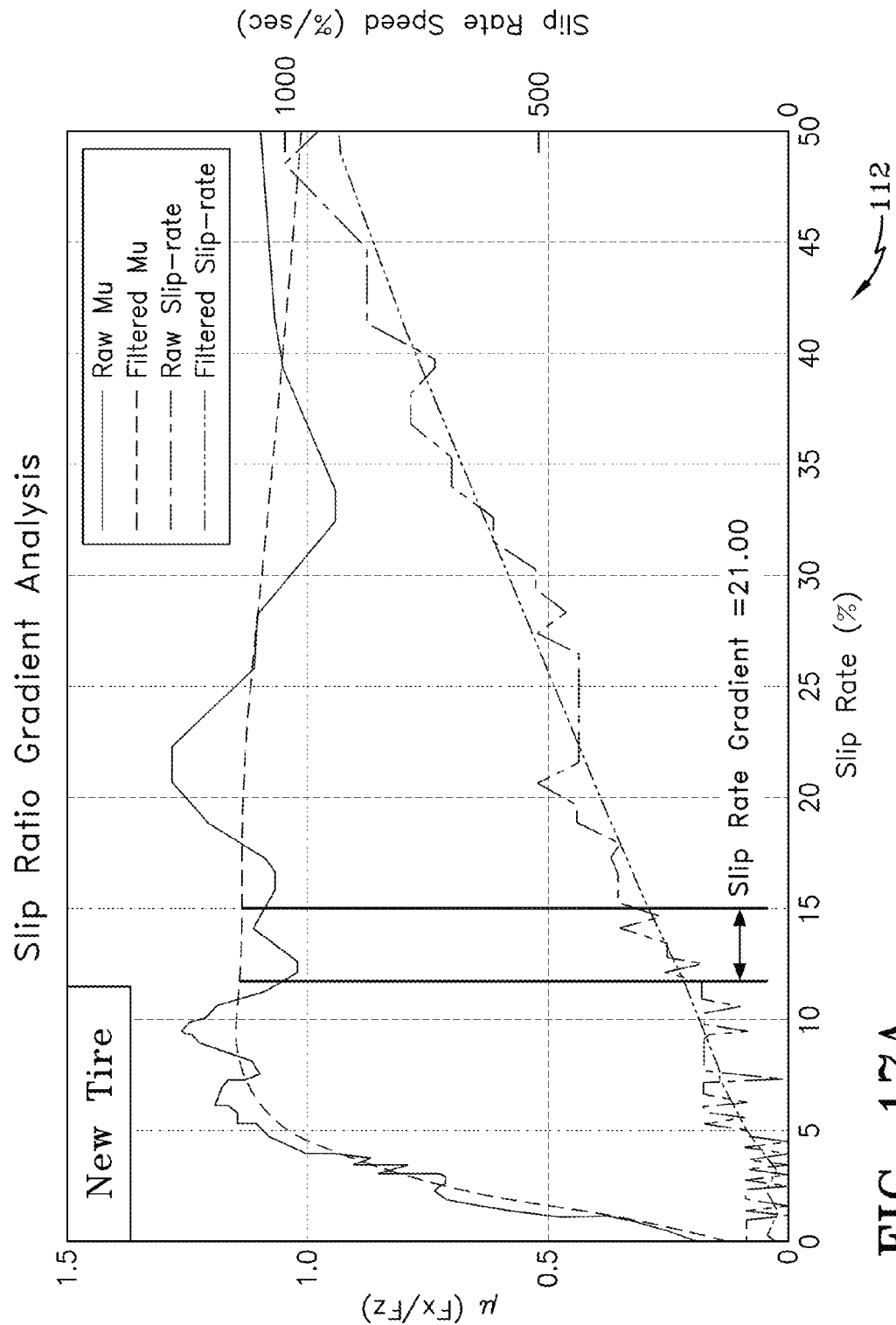
FIG. 17A is a graph showing a second slip-ratio gradient analysis in a new tire and showing raw vs. filtered mu and slip-rate variance.
Figure 17B:
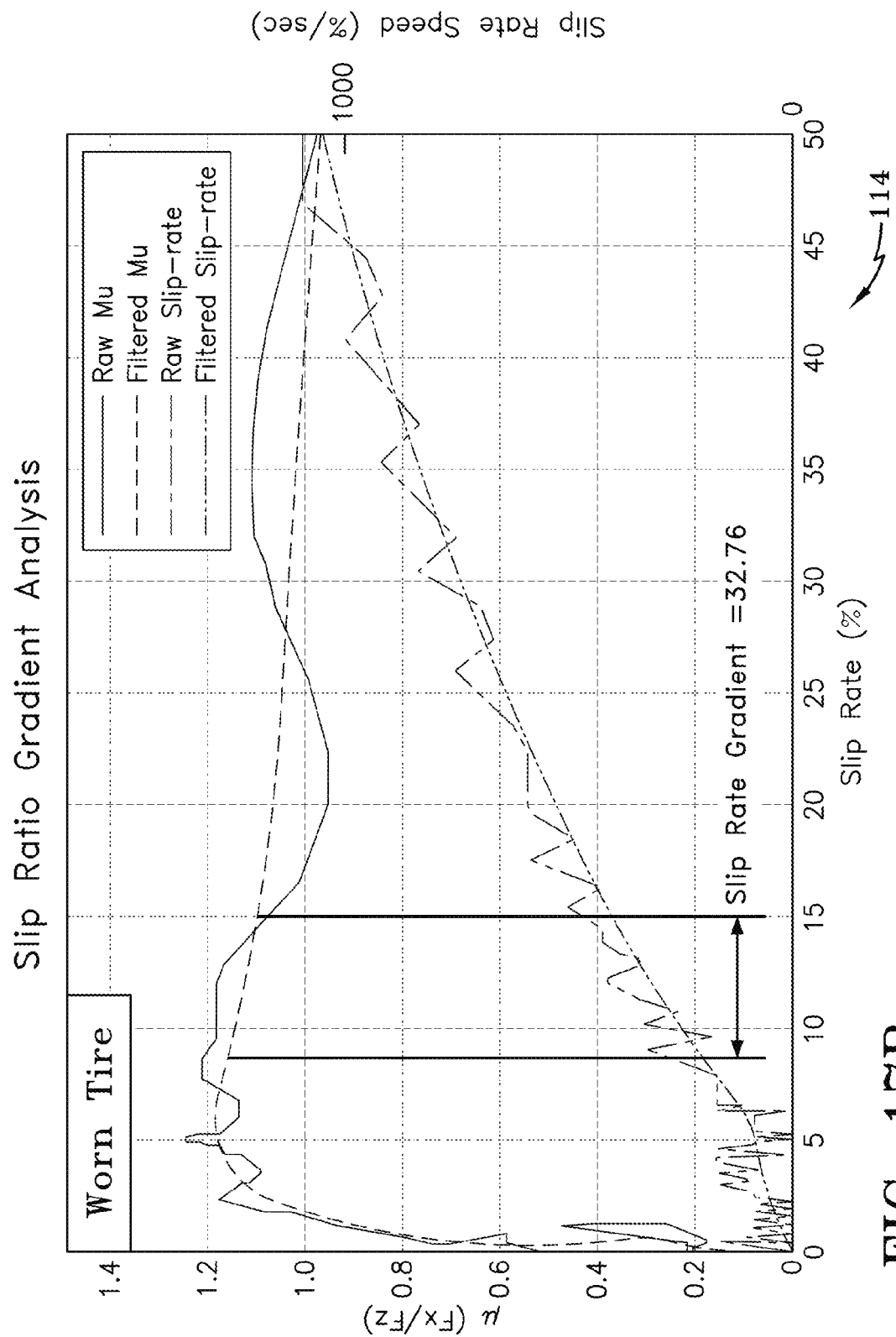
FIG. 17B is a graph similar to FIG. 17A in the second analysis but for a worn tire.

FIG. 16A is a graph 108 showing a slip-ratio gradient analysis for a new tire. Slip-ratio gradient is defined as the change in friction vs. the slip-rate. The graph plots raw mu, filtered mu, raw slip-rate and filtered slip-rate. The slip-rate gradient equals 21.66. In FIG. 16B, the same test is conducted on a worn tire yielding graph 110 having a slip-rate gradient equal 29.76. Second test results are graphed at 112 (FIG. 17A) for a new tire and at graph 114 for a worn tire (FIG. 17B). Comparable relative results are thus verified that slip-ratio variation between a new and a worn tire tread.

A display (not shown) may be provided for communicating the estimated tire wear state to an operator of the vehicle. The display may be vehicle-based and/or a handheld smartphone device connect to display the estimated tire wear state of each tire from the tire-wear state estimator that calculates the state of tire wear.

From the foregoing, it will be appreciated that a novel algorithm is provided by which tire wear state may be indirectly estimated. The tire wear state is estimated by using a support vector (SV) data classification algorithm 104 as seen in FIG. 15 and explained above. The model inputs for the support vector (SV) data classification algorithm include: (1) the tire median slip-ratio, and (2) the slip-ratio rate. Median slip-ratio and slip-ratio rate indirectly characterize the mu-slip curve of the tire which changes with a change in the tire wear state as demonstrated in the test result graphs and discussion above. Inputs listed (1 and 2) are determined from statistical analysis of the wheel signal available on the vehicle CAN bus. Test results summarized in the graphs above verify the applicability of the algorithm and its effectiveness in indirectly estimating tire wear.

A tire wear state estimation system for each tire supporting a vehicle is thus provided that utilizes a vehicle-based wheel-speed sensor signal available from the CAN bus. A first tire wear-sensitive feature and a second tire wear-sensitive feature are extracted from the wheel speed signal using commonly known statistical analysis techniques. A support vector (SV) data classification algorithm takes the median slip-ratio and slip-ratio rate input data and, from the data, makes an estimation of the wear state of the tire.

With reference to FIG. 15, the method employed by the tire wear state estimation system, in a broad sense, is not restricted exclusively to tire wear state estimation but is of particular utility in estimating tire wear state. From a general perspective, the method employed: utilizes a vehicle-based sensor for measuring a wheel speed of the tire and generating a wheel speed signal; extracts a first extracted feature from the wheel speed signal; extracts a second feature from the wheel speed signal; classifies data from the first extracted feature and data from the second extracted feature using a support vector data classification algorithm; and applies the algorithm to estimate the tire state.

The method further adapts the support vector data classification algorithm through the use of tire-specific parameter measurements and identification. The tire is equipped with tire temperature, pressure sensors and a tire ID module from which the tire construction characteristics may be identified. The support vector data classification algorithm may be adapted to reflect the measured tire parameters and the tire construction characteristics by, in essence, shifting the line 116 defining worn vs. new tire classification in FIG. 15. As the median slip-ratio data and the slip-ratio rate data are extracted by statistical analysis from the wheel speed signal, the analysis of the tire wear state may be adapted to reflect the tire parameter measurements and identification.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire wear state estimation system comprising:
   a tire supported by a wheel and supporting a vehicle;
   a vehicle-based sensor for measuring a wheel speed of the wheel supporting the tire and generating a wheel speed signal;
   a feature-extracting processor for extracting from the wheel speed signal a median slip-ratio of the tire, wherein the median slip-ratio of the tire is operably determined by a statistical analysis of the wheel speed signal;
   a feature-extracting processor for extracting from the wheel speed signal a slip-ratio rate of the tire, wherein the slip-ratio rate of the tire is operably determined by a statistical analysis of the wheel speed signal;
   a data classifier receiving as data inputs median slip-ratio data and slip-ratio rate data; the data classifier operable to conduct a classification of the median slip-ratio data relative to the slip-ratio rate data to estimate a wear state for the tire.

2. The tire wear state estimation system of claim 1, further comprising:
   a tire-mounted temperature sensor for measuring a temperature of the tire;
   a tire-mounted pressure sensor for measuring an air pressure within the tire;
   a tire identification module mounted to the tire for identifying the tire;
   an accessible tire construction database operable to identify tire construction characteristics based upon tire identification by the tire identification module; and
   wherein the data classifier is operable to adaptively modify the classification of the median slip-ratio data relative to the slip-ratio rate data based upon the measured temperature of the tire, the measured air pressure within the tire and the identified tire construction characteristics.

3. The tire wear state estimation system of claim 1, wherein the estimation of the wear state of the tire is operably determined from a support vector data classification algorithm using as inputs the median slip-ratio data of the tire and the slip-ratio data of the tire.

4. The tire wear state estimation system of claim 3, further comprising:
   a tire-mounted temperature sensor for measuring a temperature of the tire;
   a tire-mounted pressure sensor for measuring an air pressure within the tire;
   a tire identification module mounted to the tire for identifying the tire;
   an accessible tire construction database operable to identify tire construction characteristics based upon tire identification by the tire identification module; and
   wherein the data classifier is operable to adaptively modify the classification of the median slip-ratio relative to the slip-ratio rate based upon the measured temperature of the tire, the measured air pressure within the tire, and the identified tire construction characteristics.

5. A tire wear state estimation system comprising:
   a tire supported by a wheel and supporting a vehicle;
   a vehicle-based sensor for measuring a wheel speed of the wheel supporting the tire and generating a wheel speed signal;
   a feature-extracting processor for extracting from the wheel speed signal a median slip-ratio of the tire, the median slip-ratio of the tire quantitatively changing responsive to a wear level change of the tire, and wherein the median slip-ratio of the tire is operably determined by a statistical analysis of the wheel speed signal;
   a feature-extracting processor for extracting from the wheel speed signal a slip-ratio rate of the tire, the slip-ratio rate of the tire quantitatively changing responsive to a wear level change of the tire, and wherein the slip-ratio rate of the tire is operably determined by a statistical analysis of the wheel speed signal;
   a data classifier receiving as inputs median slip-ratio data and slip-ratio rate data; the data classifier operable to conduct a classification of the median slip-ratio data relative to the slip-ratio rate data;
   a wear state estimator operable to estimate a wear state for the tire based upon the classification of the median slip-ratio data relative to the slip-ratio rate data.

6. The tire wear state estimation system of claim 5, wherein the estimation of the wear state of the tire is operably determined from a support vector data classification algorithm using as inputs the median slip-ratio data of the tire and the slip-ratio data of the tire.

* * * * *